United States Patent
Beon et al.

(10) Patent No.: US 9,894,348 B2
(45) Date of Patent: Feb. 13, 2018

(54) DRIVER ASSISTANCE FOR A VEHICLE

(71) Applicant: LG Electronics Inc., Seoul (KR)

(72) Inventors: Dokyun Beon, Seoul (KR); Hyunil Kwon, Seoul (KR); Yeonchool Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/951,615

(22) Filed: Nov. 25, 2015

(65) Prior Publication Data
US 2016/0173858 A1 Jun. 16, 2016

(30) Foreign Application Priority Data

Dec. 10, 2014 (KR) .................. 10-2014-0177582

(51) Int. Cl.
*G06K 9/00* (2006.01)
*H04N 13/02* (2006.01)
*B60W 30/00* (2006.01)

(52) U.S. Cl.
CPC ........ *H04N 13/0296* (2013.01); *B60W 30/00* (2013.01); *G06K 9/00697* (2013.01); *G06K 9/00704* (2013.01); *G06K 9/00791* (2013.01); *G06K 9/00798* (2013.01); *G06K 9/00805* (2013.01); *G06K 9/00825* (2013.01); *G06K 9/00986* (2013.01); *G06K 9/00993* (2013.01); *B60W 2420/42* (2013.01); *B60W 2900/00* (2013.01)

(58) Field of Classification Search
None
See application file for complete search history.

(56) References Cited

U.S. PATENT DOCUMENTS

| | | | |
|---|---|---|---|
| 2001/0055484 A1* | 12/2001 | Kochi | .................. G03B 35/00 396/324 |
| 2005/0223379 A1 | 10/2005 | Rehg et al. | |
| 2009/0328046 A1 | 12/2009 | Proctor et al. | |
| 2015/0332114 A1* | 11/2015 | Springer | .............. G06K 9/4604 348/148 |

FOREIGN PATENT DOCUMENTS

WO 2008/139328 11/2008

OTHER PUBLICATIONS

Extended European Search Report issued in European Application No. 15003301.7 dated May 4, 2016, 9 pages.

* cited by examiner

*Primary Examiner* — James M McPherson
(74) *Attorney, Agent, or Firm* — Fish & Richardson P.C.

(57) ABSTRACT

Systems and techniques are disclosed for driver assistance. A driver assistance apparatus executes a first plurality of operations for a first frame of stereo images acquired by a stereo camera, and then executes a second plurality of operations for a second frame of the stereo images. The driver assistance apparatus includes at least one processor configured to receive the first frame from the stereo camera and determine a first scheduling for the first plurality of operations in the first frame, execute the first plurality of operations according to the first scheduling, and measure execution times of the first plurality of operations according to the first scheduling. The at least one processor then receives the second frame from the stereo camera and determines a second scheduling for the second plurality of operations based on the measured execution times of the first plurality operations that were executed in the first frame.

23 Claims, 21 Drawing Sheets

(a)

(b)

(a)

(b)

(a)

(b)

DRIVER ASSISTANCE FOR A VEHICLE

CROSS-REFERENCE TO RELATED APPLICATION

Pursuant to 35 U.S.C. § 119(a), this application claims the benefit of an earlier filing date and right of priority to Korean Patent Application No. 10-2014-0177582, filed on Dec. 10, 2014 in the Korean Intellectual Property Office, the disclosure of which is incorporated herein by reference.

TECHNICAL FIELD

The present application relates to driver assistance for a vehicle.

BACKGROUND

A vehicle is a device that allows a driver to move in a desired direction. A representative example of the vehicle may be a car.

In order to improve convenience of a user who uses the vehicle, a vehicle is typically equipped with various sensors and electronic devices. In particular, various devices to improve driving convenience of the user have been developed.

SUMMARY

Systems and techniques are disclosed that enable a driver assistance apparatus to process image frames acquired from a camera based on results of processing previous image frames. The apparatus determines a scheduling for operations to be executed in a current frame based on measured execution times of the operations in previous frames.

In one aspect, a driver assistance apparatus is configured to execute a first plurality of operations in a first frame of stereo images acquired by a stereo camera and execute a second plurality of operations in a second frame of the stereo images. The driver assistance apparatus includes at least one processor configured to receive the first frame from the stereo camera and determine a first scheduling for the first plurality of operations in the first frame. The at least one processor is configured to execute, in the first frame, the first plurality of operations according to the first scheduling; and measure execution times of the first plurality of operations that were executed according to the first scheduling. The at least one processor is configured to receive the second frame from the stereo camera; and determine a second scheduling for the second plurality of operations in the second frame based on the measured execution times of the first plurality of operations that were executed in the first frame.

In some implementations, the at least one processor is further configured to measure execution times of the second plurality of operations in the second frame that were executed according to the second scheduling; receive a third frame from the stereo camera; determine, based on the measured execution times of the second plurality of operations that were executed in the second frame, a third scheduling for a third plurality of operations to be executed in the third frame; and measure execution times of the third plurality of operations in the third frame that were executed according to the third scheduling.

In some implementations, the at least one processor is configured to receive a fourth frame from the stereo camera; and determine, based on the measured execution times of the third plurality of operations in the third frame, a fourth scheduling for a fourth plurality of operations to be executed in the fourth frame.

In some implementations, the at least one processor is configured to determine the second scheduling for the second plurality of operations in the second frame based on the measured execution times of the first plurality of operations that were executed in the first frame by: estimating execution times of the second plurality of operations in the second frame based on the measured execution times of the first plurality of operations that were executed in the first frame; and determining an execution sequence for the second plurality of operations based on the estimated execution times.

In some implementations, the at least one processor is configured to determine the second scheduling for the second plurality of operations in the second frame based on the measured execution times of the first plurality of operations that were executed in the first frame further by: determining a sum of the estimated execution times of the second plurality of operations; determining whether the sum of the estimated execution times of the second plurality of operations is equal to or greater than a critical value; and based on a determination that the sum of the estimated execution times of the second plurality of operations is equal to or greater than the critical value, selecting an operation among the second plurality of operations to exclude from the second scheduling.

In some implementations, the at least one processor is configured to determine the second scheduling for the second plurality of operations in the second frame based on the measured execution times of the first plurality of operations that were executed in the first frame further by: determining a sum of the estimated execution times of the operations; determining whether the sum of the estimated execution times of the second plurality of operations is equal to or greater than a critical value. In addition, based on a determination that the sum of the estimated execution times of the second plurality of operations is equal to or greater than the critical value: the at least one processor determines whether an operation among the second plurality of operations can be excluded from the second scheduling; and based on a determination that none of the second plurality of operations can be excluded from the second scheduling, adjusts the estimated execution time of at least one operation among the second plurality of operations.

In some implementations, determining an execution sequence for the second plurality of operations based on the estimated execution times includes determining an ordering of execution for the second plurality of operations such that operations with smaller estimated execution times are executed with higher priority.

In some implementations, determining an execution sequence for the second plurality of operations based on the estimated execution times includes determining a travel environment or external environment of a vehicle; and determining the execution sequence based on the travel environment or the external environment of the vehicle.

In some implementations, determining an execution sequence for the second plurality of operations based on the estimated execution times includes accessing a predetermined ordering of operations.

In some implementations, the at least one processor is further configured to: receive, from the stereo camera, a third frame subsequent to the second frame; and determine, based on the measured execution times of the second plurality of operations that were executed in the second frame, a third scheduling for a third plurality of operations to be executed in the third frame. The third scheduling is determined such that the excluded operation that was excluded from the second scheduling is to be executed with higher priority in the third scheduling.

In some implementations, the at least one processor is configured to determine, based on the measured execution times of the second plurality of operations that were executed in the second frame, the third scheduling for the third plurality of operations to be executed in the third frame further by: determining whether the measured execution time of any one of the third plurality of operations, other than the excluded operation that was excluded from the second scheduling, is equal to or greater than a reference value; and determining an execution sequence of the third scheduling such that the operation having the measured execution time equal to or greater than the reference value is to be executed with higher priority than the excluded operation that was excluded from the second scheduling.

In some implementations, the at least one processor is configured to determine the second scheduling for the second plurality of operations in the second frame based on the measured execution times of the first plurality of operations that were executed in the first frame further by: determining that an operation among the second plurality of operations is related to safe operation of a vehicle; and determining the second scheduling such that the operation related to safe operation of the vehicle is to be executed with a highest priority in the second scheduling.

In some implementations, the at least one processor is further configured to: receive a third frame from the stereo camera; and determine, based on the measured execution times of the second plurality of operations that were executed in the second frame, a third scheduling for a third plurality of operations to be executed in the third frame. The third scheduling is determined such that the operation related to safe operation of the vehicle that was determined in the second scheduling is to be executed with highest priority in the third scheduling.

In some implementations, the at least one processor is configured to determine the second scheduling for the second plurality of operations in the second frame based on the measured execution times of the first plurality of operations that were executed in the first frame further by: determining whether at least one operation among the second plurality of operations is a requisite operation for the vehicle or an operation that yields unsatisfactory results if the execution time of the operation is less than a reference value; and determining the second scheduling such that the estimated execution time of the at least one operation is equal to or greater than the reference value.

In some implementations, the at least one processor includes a first processor and a second processor. The first processor is configured to, during the determination of the second scheduling for the second plurality of operations in the second frame based on the measured execution times of the first plurality of operations that were executed in the first frame: determine, based on the estimated execution times of the second plurality of operations, a distribution of the second plurality of operations including a first group of operations to be executed by the first processor and a second group of operations to be executed by the second processor; and determine a scheduling for the first group of operations distributed to the first processor and a scheduling for the second group of operations distributed to the second processor.

In some implementations, the first processor is further configured to distribute, based on the estimated execution times of the second plurality of operations, the first group of operations to the first processor and the second group of operations to the second processor such that the first group of operations executed by the first processor and the second group of operations executed by the second processor are balanced.

In some implementations, the first processor is further configured to: determine a sum of execution times for the first group of operations distributed to the first processor; determine whether the sum of the estimated execution times for the first group of operations distributed to the first processor is equal to or greater than a critical value; and based on a determination that the sum of the estimated execution times for the first group of operations distributed to the first processor is equal to or greater than the critical value, distribute at least one operation among the first group of operations to the second processor.

In some implementations, the first processor is further configured to: perform two-dimensional (2D) and three-dimensional (3D) based preprocessing on the second frame prior to a determination of the second scheduling; determine the distribution of the second plurality of operations including the first group of operations to be executed by the first processor and the second group of operations to be executed by the second processor based on the 2D based preprocessing; determine a sum of the estimated execution times for the first group of operations; determine whether the sum of the estimated execution times for the first group of operations is equal to or greater than a critical value; and based on a determination that the sum of the estimated execution times for the first group of operations is equal to or greater than the critical value and based on the 3D based preprocessing, distribute at least one operation among the first group of operations to the second processor.

In some implementations, the at least one processor is further configured to: execute the second plurality of operations according to the second scheduling; and measure execution times of the second plurality of operations.

In some implementations, the at least one processor is further configured to calculate a variation in execution time of each operation based on the measured execution times of the first plurality of operations that were executed according to the first scheduling and the measured execution times of the second plurality of operations that were executed according to the second scheduling.

In some implementations, the at least one processor is further configured to: receive a third frame from the stereo camera; and determine, based on the measured execution times of the second plurality of operations that were executed in the second frame, a third scheduling for a third plurality of operations to be executed in the third frame. The third scheduling is determined based on the calculated variation in execution time of each operation.

In some implementations, the driver assistance apparatus further includes a display unit configured to display a screen based on the first plurality of operations executed according to the first scheduling or the second plurality of operations executed according to the second scheduling.

In some implementations, the driver assistance apparatus further includes a memory configured to store the measured execution times of the first plurality of operations.

In another aspect, an operation method of a driver assistance apparatus is disclosed that executes a plurality of operations based on a first frame of stereo images acquired by a stereo camera and then executes a plurality of operations based on a second frame of the stereo images. The operation method includes receiving the first frame from the stereo camera, and determining a first scheduling for the first plurality of operations in the first frame. The operation method also includes executing, in the first frame, the first plurality of operations according to the first scheduling, and measuring execution times of the first plurality of operations that were executed according to the first scheduling. The operation method further includes receiving the second frame from the stereo camera; and determining a second scheduling for the second plurality of operations in the second frame based on the measured execution times of the first plurality of operations that were executed in the first frame.

In some implementations, the operation method further includes outputting, to a display unit, a screen based on the first plurality of operations executed according to the first scheduling or the second plurality of operations executed according to the second scheduling.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

In recent years, interest in an autonomous car, i.e. a self-driving car, has increased, and therefore research has been actively conducted into a sensor equipped in the autonomous car. Examples of the sensor equipped in the autonomous car may include a camera, an infrared sensor, a radio detection and ranging (radar) sensor, a global positioning system (GPS) sensor, a light detection and ranging (lidar) sensor, and a gyroscope. Among them, a camera may perform important functions as a sensor to detect objects or environmental conditions around a vehicle.

A processor that process images acquired by the camera may execute a plurality of operations per image frame. In general, the processor may execute a plurality of operations per frame based on an execution time assigned for each frame. During execution of a plurality of operations based on operation execution times assigned for one frame, the next frame may be input, and one or more operations that have not been completed in the previous frame may be interrupted before operations are executed in the next frame. In this case, the operations executed by the processor may have errors. In addition, the efficiency of the processor may be sacrificed as a result of unprocessed or delayed operations.

Systems and techniques are disclosed that enable a driver assistance apparatus to process image frames acquired from a camera based on results of processing previous image frames. The apparatus determines a scheduling for operations to be executed in a current frame based on measured execution times of the operations in previous frames.

A vehicle as described in this specification may include a car and a motorcycle, but implementations are not necessarily limited thereto, and may generally include any suitable vehicle that transports people. Hereinafter, a description will be given based on a car.

A vehicle as described in this application may include a vehicle equipped with an engine, a hybrid vehicle equipped with an engine and an electric motor, an electric vehicle equipped with an electric motor, or generally a vehicle that is motorized by any suitable power source. Hereinafter, a description will be given based on a vehicle equipped with an engine.

In some implementations, a driver assistance apparatus may be an advanced driver assistance system (ADAS) or an advanced driver assistance apparatus (ADAA). Hereinafter, a description will be given of various examples of a driver assistance apparatus and a vehicle including the same.

Figure 1:
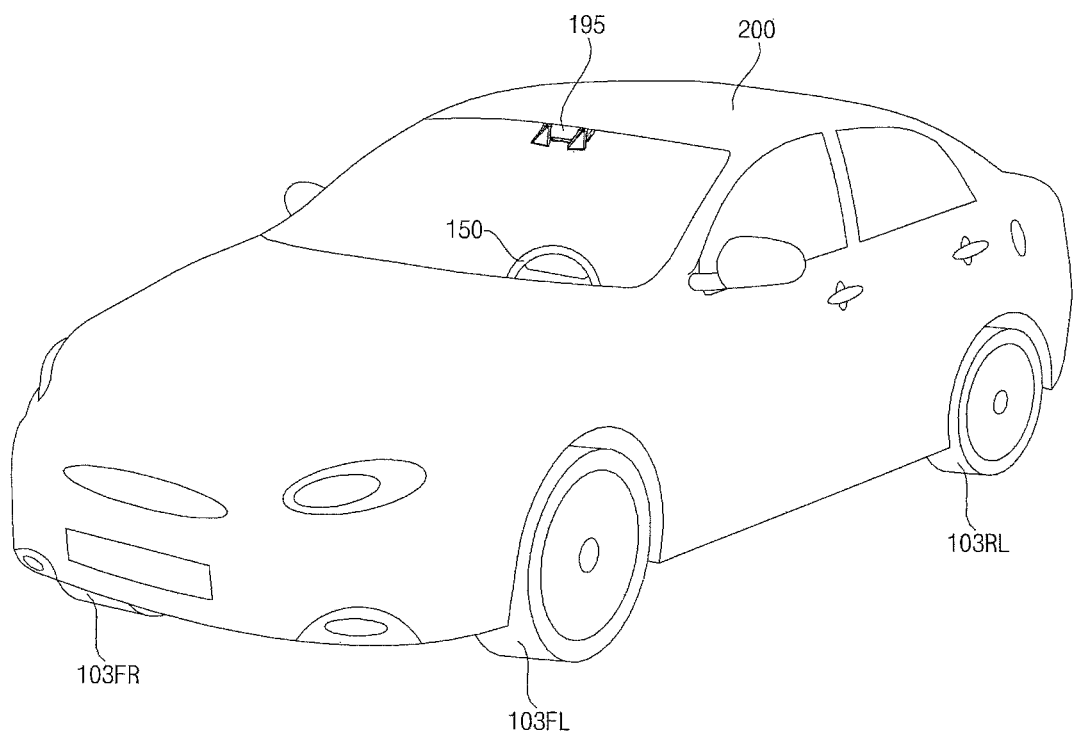
FIG. 1 is a diagram illustrating an example of an external appearance of a vehicle equipped with a stereo camera.

FIG. 1 is a view showing an example of an external appearance of a vehicle equipped with a stereo camera.

Referring to FIG. 1, a vehicle 200 may include wheels 103FR, 103FL, 103RL, etc. configured to be rotated by a power source, a steering wheel 150 configured to control a movement direction of the vehicle 200, and a stereo camera 195 provided in the vehicle 200.

In some implementations, the stereo camera 195 may include a plurality of cameras. Stereo images acquired by the camera(s) may be signal-processed in a driver assistance apparatus 100 (see, e.g., FIG. 3).

FIG. 1 shows, by way of example, a stereo camera 195 that includes two cameras.

Figure 2:
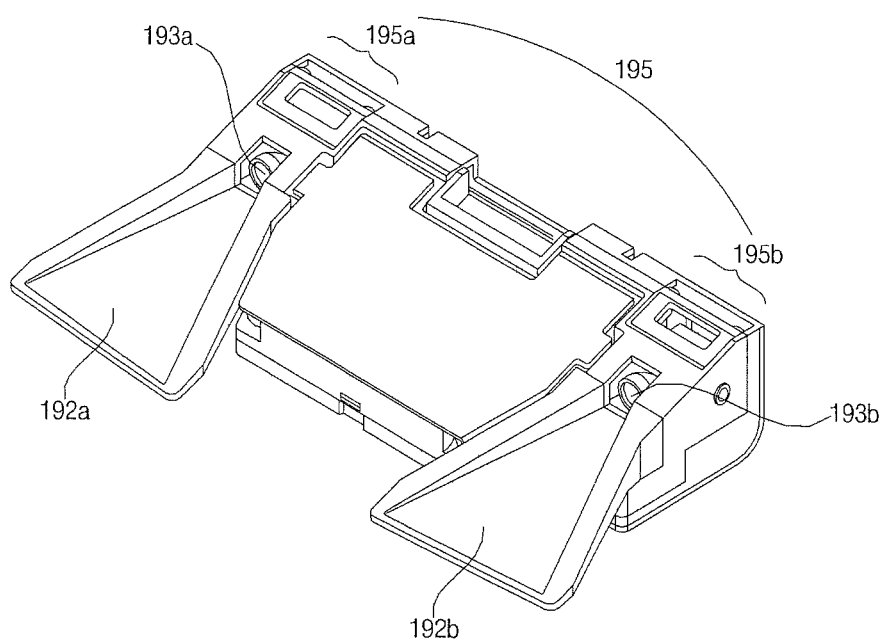
FIG. 2 is a diagram illustrating an example of an external appearance of a stereo camera attached to a vehicle.

FIG. 2 is a view showing an example of the external appearance of a stereo camera attached to a vehicle (e.g., the vehicle shown in FIG. 1).

Referring to the example of FIG. 2, the stereo camera 195 may include a first camera 195a having a first lens 193a and a second camera 195b having a second lens 193b.

In some implementations, the stereo camera 195 may further include a first light shield unit 192a to shield light incident upon the first lens 193a and a second light shield unit 192b to shield light incident upon the second lens 193b.

The stereo camera 195 shown in FIG. 2 may, in some implementations, be detachably attached to a ceiling or a windshield of the vehicle 200.

A driver assistance apparatus 100 (see, e.g., FIG. 3) equipped with the stereo camera 195 with the above-stated construction may acquire stereo images for a view in a direction ahead of the vehicle from the stereo camera 195, detect disparity based on the stereo images, detect an object for at least one of the stereo images based on disparity information, and track (e.g., continuously) a motion of the object after detection of the object.

In some implementations, the stereo camera 195 may capture images as a sequence of frames. Each frame may represent a single image of the view in a direction ahead of the vehicle.

Figure 3A:
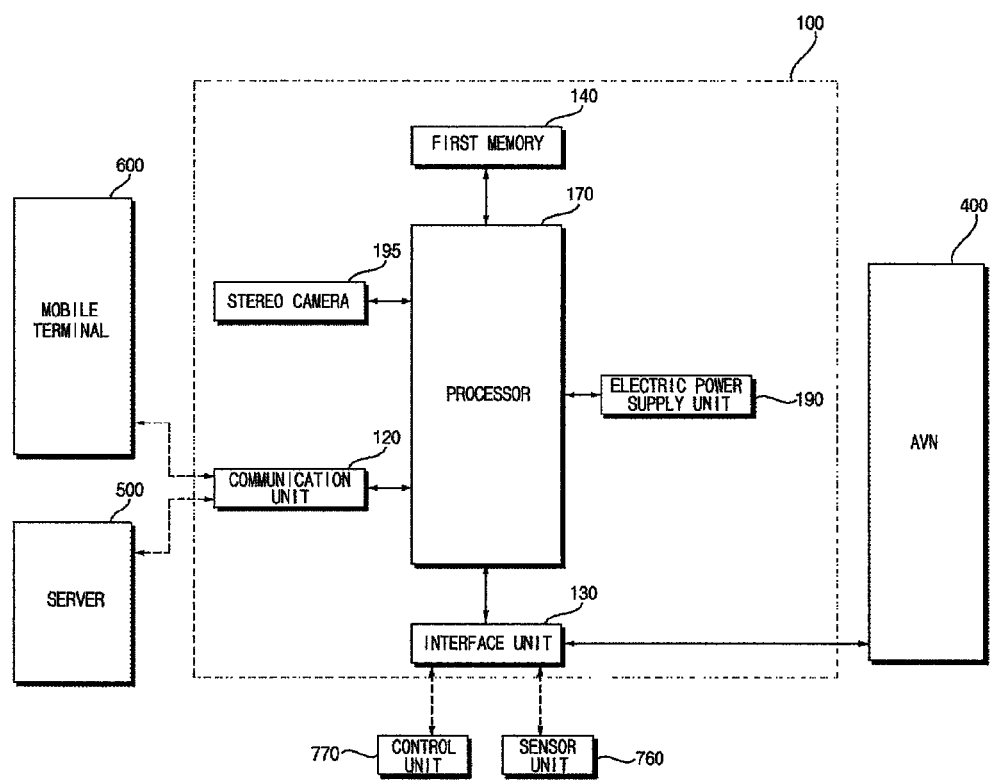
FIGS. 3A and 3B are internal block diagrams illustrating various examples of a driver assistance apparatus.
Figure 3B:
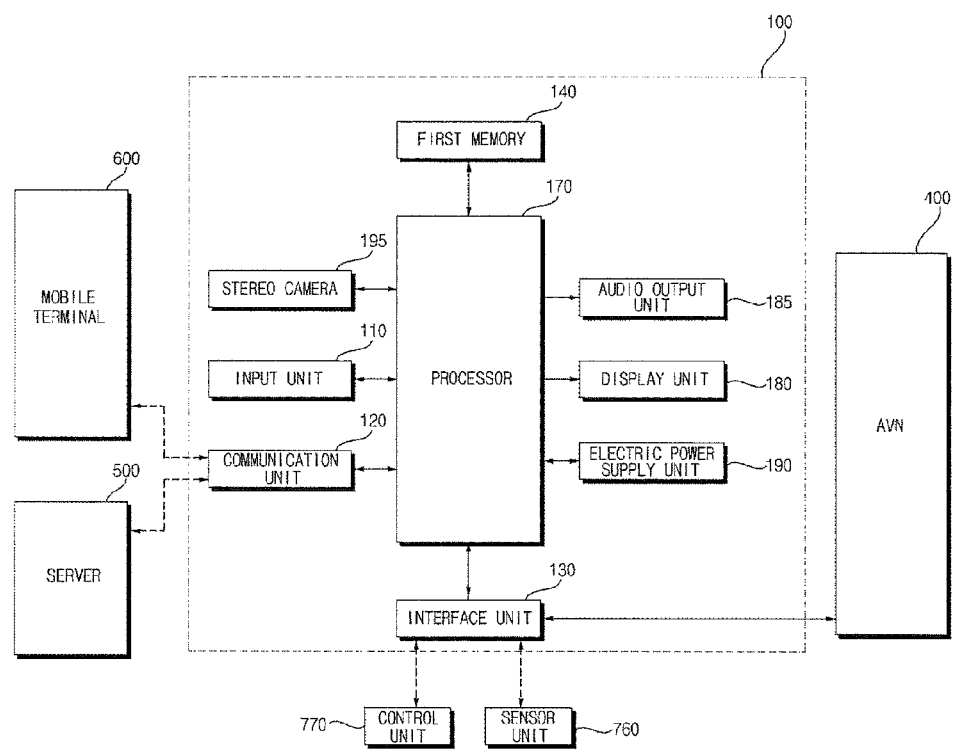

FIGS. 3A and 3B are internal block diagrams showing various examples of a driver assistance apparatus.

Referring to FIGS. 3A and 3B, a driver assistance apparatus 100 may perform signal-processing of stereo images received from the stereo camera 195 based on computer vision to create vehicle-related information. The vehicle-related information may include vehicle control information for direct control of the vehicle or driver assistance information for driving guidance provided to a driver.

Referring first to the example of FIG. 3A, the driver assistance apparatus 100 may include a communication unit 120, an interface unit 130, a first memory 140, a processor 170, an electric power supply unit 190, a stereo camera 195, and a stereo camera drive unit.

The communication unit 120 may exchange data with a mobile terminal 600 or a server 500 in a wireless fashion. For example, the communication unit 120 may exchange data with a mobile terminal of the driver in a wireless fashion. Any suitable wireless data communication protocol may be used, such as Bluetooth, Wi-Fi, Wi-Fi Direct, and/or Automotive Pixel Link (APiX).

The communication unit 120 may receive any suitable type of information. For example, the communication unit 120 may receive weather information and road traffic state information, such as Transport Protocol Expert Group (TPEG) information, from the mobile terminal 600 or the server 500. In some implementations, the communication unit 120 may transmit real-time traffic information acquired by the driver assistance apparatus 100 based on stereo images to the mobile terminal 600 or the server 500.

When a user gets into the vehicle, a mobile terminal 600 of the user may pair with the driver assistance apparatus 100, for example automatically or by the user executing an application.

The interface unit 130 may receive vehicle-related data from or transmit a signal that is processed or created by the processor 170 to a system or device external to the vehicle. In such scenarios, the interface unit 130 may perform data communication with a control unit 770, an audio video navigation (AVN) apparatus 400, and a sensor unit 760 in the vehicle in a wired communication fashion or a wireless communication fashion.

The interface unit 130 may receive map information related to vehicle travel through data communication with the AVN apparatus 400. For example, the AVN apparatus 400 may include a navigation system, and the interface unit 130 may receive and transmit a suitable type of information. For example, the interface unit 130 may receive a map and information regarding the position of the vehicle on the map from the navigation system and transmit the map and the vehicle position information to the processor 170.

In some implementations, the interface unit 130 may receive sensor information from the control unit 770 and the sensor unit 760.

The sensor information may include information regarding at least one of a slip vehicle degree, vehicle heading information, vehicle position information (global positioning system (GPS) information), vehicle angle information, vehicle speed information, vehicle acceleration information, vehicle tilt information, vehicle forward movement/backward movement information, battery information, fuel information, tire information, vehicle lamp information, in-vehicle temperature information, or in-vehicle humidity information.

The sensor information may be acquired by at least one of a wheel speed sensor, a heading sensor, a yaw sensor, a gyro sensor, a position module, a vehicle forward movement/backward movement sensor, a wheel sensor, a vehicle speed sensor, a vehicle body tilt sensor, a battery sensor, a fuel sensor, a tire sensor, a steering sensor, an in-vehicle temperature sensor, or an in-vehicle humidity sensor. The position module may include a GPS module to receive GPS information.

Of the above-specified sensor information, some information may be related to vehicle travel. For example, the vehicle heading information, the vehicle position information, the vehicle angle information, the vehicle speed information, and the vehicle tilt information, which are related to vehicle travel, may be referred to as vehicle travel information.

The first memory 140 may store various data and information for overall operation of the driver assistance apparatus 100, such as computer-readable programs for processing or control of the processor 170.

The first memory 140 may be connected (e.g., electrically) to the processor 170 to store basic data for the units, control data to control operations of the units, and input and output data. The first memory 140 may be one of various storage devices, such as a read only memory (ROM), a random access memory (RAM), an erasable programmable ROM (EPROM), a flash drive, and a hard drive.

The processor 170 may be configured to perform processing for frames that have been captured by the stereo camera 195. For example, the processor 170 may be configured to execute one or more operations for each frame. Each operation of a frame may require a particular amount of time to be executed by the processor 170, and may be referred to as an operation execution time.

The first memory 140 may store a plurality of measured operation execution times. As a specific example, a database (see, e.g., database (DB) 141 in FIG. 9) provided in the first memory 140 may store a plurality of operation execution times measured by an execution time measurement unit (see, e.g., execution time measurement unit 950 in FIG. 9). For example, if three operations are to be executed for a frame, then the database (e.g., DB 141 in FIG. 9) may store first to third operation execution times per frame of stereo images.

In some implementations, an audio output unit may convert an electric signal received from the processor 170 into an audio signal and output the audio signal. In such scenarios, the audio output unit may include a speaker, for example. The audio output unit may output a sound corresponding to the operation of an input unit, e.g., a user pressing a button.

In some implementations, an audio input unit may receive a user's voice. In such scenarios, the audio input unit may include a microphone, for example. The received voice may be converted into an electric signal, which may be transmitted to the processor 170.

The processor 170 may, in some cases, control overall operation of each unit in the driver assistance apparatus 100.

The processor 170 may perform signal processing on images that have been captured by the stereo camera 195, for example based on computer vision. In such scenarios, the processor 170 may process stereo images for a view in a direction ahead of the vehicle that have been captured from the stereo camera 195. The processor 170 may perform signal processing on the images. Such signal processing may include, for example, calculating a disparity for the view ahead of the vehicle based on the stereo images, detecting an object for at least one of the stereo images based on the calculated disparity information, and/or tracking (e.g., continuously) a motion of the object after detection of the object.

In some implementations, during detection of an object in a frame that has been captured by the stereo camera 195, the processor 170 may execute various operations for detecting the object in the frame. Such object detection operations may include, for example, lane detection (LD), adjacent vehicle detection (VD), pedestrian detection (PD), bright spot detection (BD), traffic sign recognition (TSR), and/or road surface detection.

In addition, the processor 170 may, in some implementations, calculate the distance to the detected objection (e.g., an adjacent vehicle), a speed of the detected adjacent vehicle, and a difference in speed with the detected adjacent vehicle.

In some implementations, the processor 170 may generate information regarding a road surface on which the vehicle is traveling based on the stereo images. For example, the processor 170 may classify a state of the road surface into one of several states, such as a dry state, a wet state, a snowy state, or a frozen state based on the stereo images. In some implementations, this classification may be performed based on differences in brightness data of the stereo images. For example, the snowy state may have the highest brightness level, and the dry state, the frozen state, and the wet state may have sequentially lower brightness levels. As described above, therefore, the state of the road surface may be classified into the dry state, the wet state, the snowy state, or the frozen state based on the brightness. As another example, the processor 170 of the driver assistance apparatus 100 may classify the road surface data into the dry state, the wet state, the snowy state, or the frozen state based on intensity and exposure of the images.

The processor 170 may detect other features of the road based on the stereo images. For example, the processor 170 may detect a slope of the road. The processor 170 may output a control signal to control a brake drive unit of the vehicle to the control unit 770 based on an upward slope or a downward slope of the front road and road surface information.

The processor 170 may receive various types of information from different components of the vehicle. For example, the processor 170 may receive weather information and road traffic state information, such as TPEG information, through the communication unit 120.

As another example, the processor 170 may acquire, in real time, traffic-around-vehicle state information acquired by the driver assistance apparatus 100 based on stereo images.

As another example, the processor 170 may receive map information from the AVN apparatus 400 through the interface unit 130.

As another example, the processor 170 may receive sensor information from the control unit 770 or the sensor unit 760 through the interface unit 130. The sensor information may include information regarding at least one of vehicle slip information, vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, or in-vehicle humidity information. In addition, the processor 170 may receive control information of each unit provided in the vehicle from the control unit 770 through the interface unit 130.

As another example, the processor 170 may receive information regarding the road on which the vehicle 200 is traveling excluding a region of the road displayed in the stereo images from the navigation system to estimate a state of the road. As a more specific example, the processor 170 may estimate a state of the road ahead of the vehicle or at the rear of the vehicle which is not displayed in the stereo images. The road state may include a curve of the road, the presence of a tunnel, and/or a number of lanes in the road.

In some cases, the processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electrical units configured to perform other functions. The processor 170 may be mounted on one surface of a predetermined circuit board.

The electric power supply unit 190 may supply electric power to the respective components under control of the processor 170. As a specific example, electric power from an in-vehicle battery may be supplied to the electric power supply unit 190.

The stereo camera 195 may include a plurality of cameras. In the following example, the stereo camera 195 includes two cameras as previously described with reference to FIG. 2.

The stereo camera 195 may be detachably attached to a ceiling or a windshield of the vehicle 200. The stereo camera 195 may include a first camera 195a having a first lens 193a and a second camera 195b having a second lens 193b.

In some implementations, the stereo camera 195 may further include a first light shield unit 192a to shield light incident upon the first lens 193a and a second light shield unit 192b to shield light incident upon the second lens 193b.

Referring now to the example in FIG. 3B, a driver assistance apparatus 100 may further include an input unit 110, a display unit 180, and an audio output unit 185 as compared with the example of a driver assistance apparatus 100 that was shown in FIG. 3A. Hereinafter, a description will be given of only the input unit 110, the display unit 180, and the audio output unit 185.

The input unit 110 may include an interface, such as a plurality of buttons or a touchscreen, attached to the driver assistance apparatus 100, and in some cases, specifically attached to the stereo camera 195. The driver assistance apparatus 100 may be powered-on through by a user operating the plurality of buttons or the touchscreen such that the driver assistance apparatus 100 can be operated. In some implementations, various input operations may be executed additionally or alternatively through the input unit 110.

The audio output unit 185 outputs a sound based on an audio signal processed by the processor 170 to an outside of the vehicle. In such scenarios, the audio output unit 185 may include at least one speaker.

The display unit 180 may display an image related to the operation of the driver assistance apparatus. In order to display such an image, the display unit 180 may include a cluster or a head up display (HUD) provided at the inside front of the vehicle. In a case in which the display unit 180 is the HUD, the display unit 180 may include a projection module to project an image on the windshield of the vehicle 200.

In some implementations, the display unit 180 may output a screen based on processing that has been performed by the processor 170 for a frame. For example, if the operation execution unit 930 (see FIG. 9) executes a plurality of operations for a frame, the display unit 180 may output a screen based on results of the executed operations. The display unit 180 may display a screen based on a plurality of operations under control of the processor 170. As an example, if three operations are executed for a particular frame, the display unit 180 may display a screen based on first to third operations executed under control of the processor 170.

For example, the operations to be executed for a frame may include lane detection (LD), pedestrian detection (PD), and/or adjacent vehicle detection (VD). The display unit 180 may display a lane display screen based on the lane detection operation, a pedestrian distance screen based on the pedestrian detection operation, and/or an adjacent vehicle screen based on the adjacent vehicle detection operation.

Figure 4A:
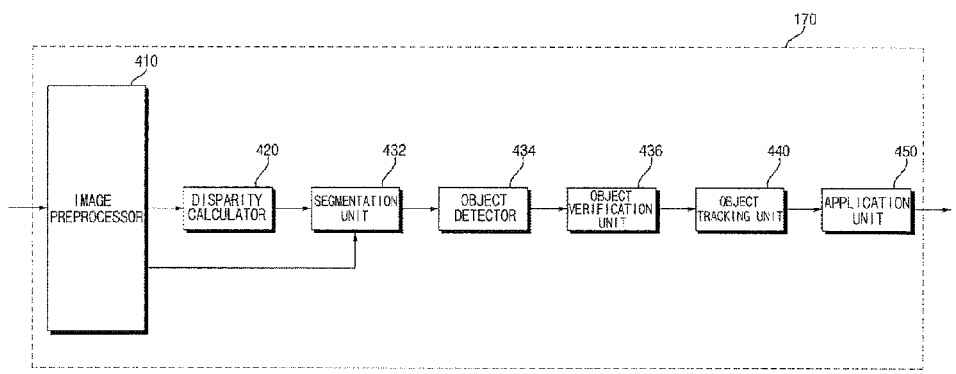
FIGS. 4A and 4B are internal block diagrams illustrating various examples of a processor.
Figure 4B:
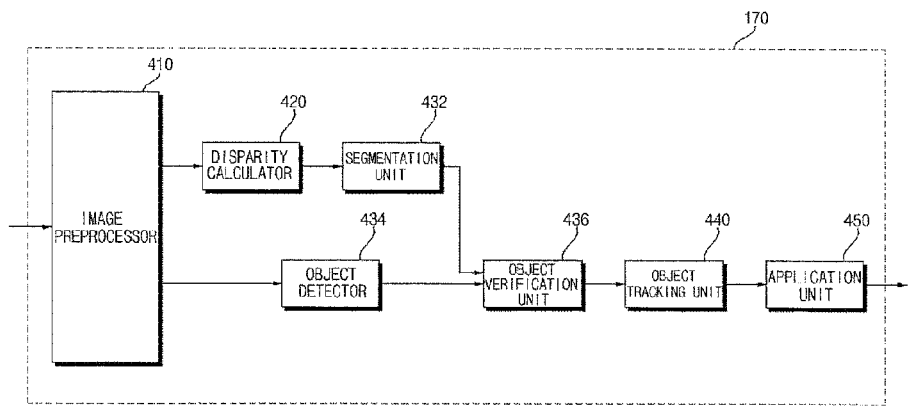
Figure 5A:
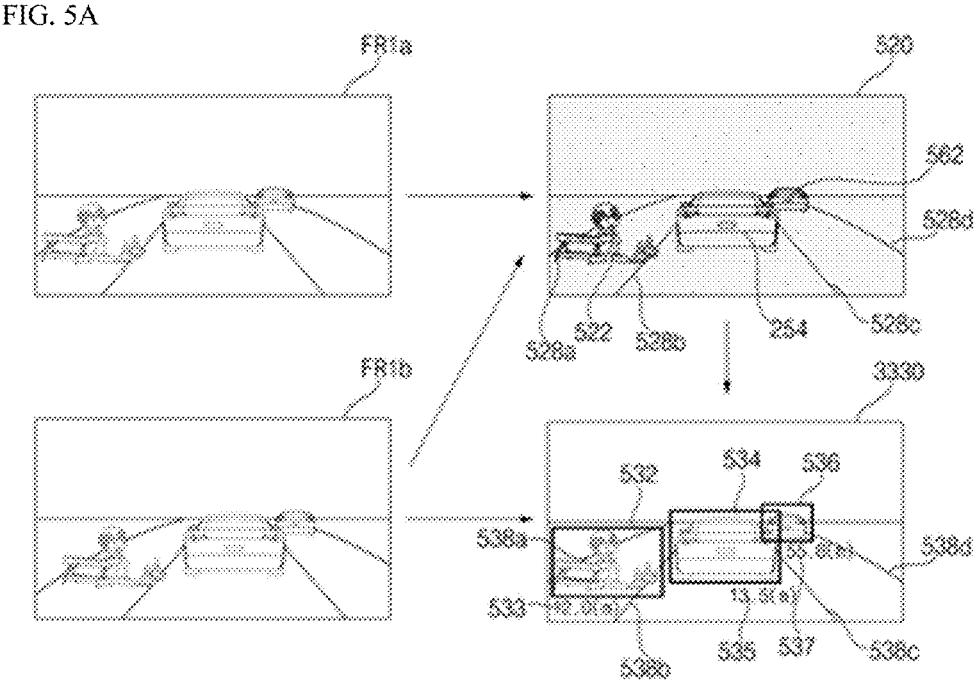
FIGS. 5A and 5B are diagrams illustrating examples of operations of a processor.
Figure 5B:
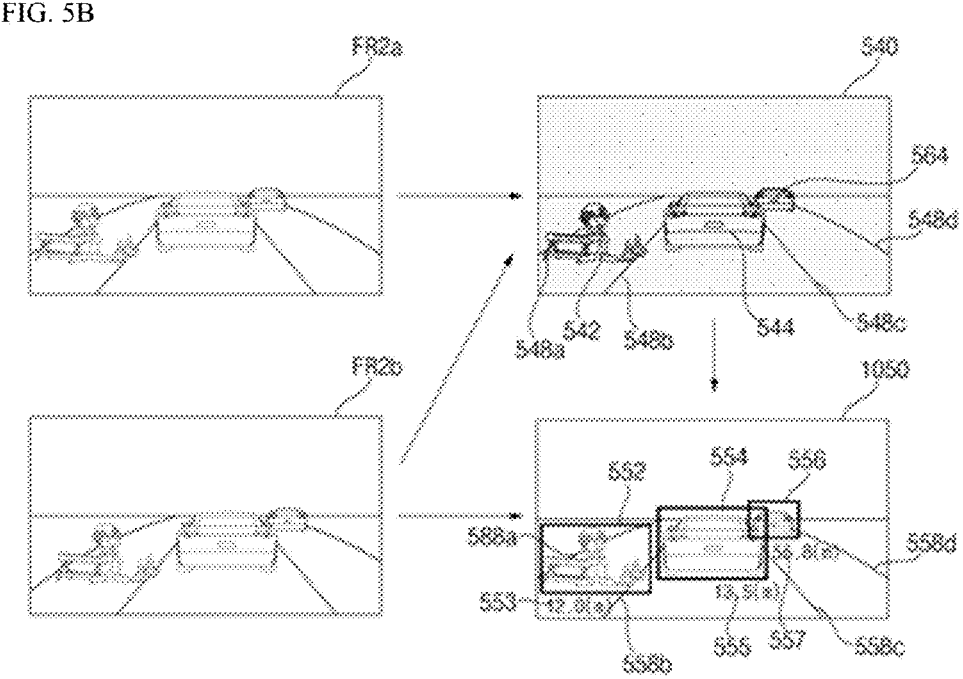

FIGS. 4A and 4B are internal block diagrams showing various examples of a processor (e.g., the processors shown in FIGS. 3A and 3B). FIGS. 5A and 5B are reference views illustrating examples of operations of a processor (e.g., the processors shown in FIGS. 4A and 4B).

Referring first to FIG. 4A, which is an internal block diagram showing an example of the processor 170, the processor 170 of the driver assistance apparatus 100 may include an image preprocessor 410, a disparity calculator 420, a segmentation unit 432, an object detector 434, an object verification unit 436, an object tracking unit 440, and an application unit 450.

The image preprocessor 410 receives stereo images from the stereo camera 195 and preprocesses the received stereo images.

In some implementations, the image preprocessor 410 may perform noise reduction, rectification, calibration, color enhancement, color space conversion (CSC), interpolation, and/or camera gain control for the stereo images. As a result, in some scenarios, the image preprocessor 410 may perform various types of processing to enhance the stereo images (e.g., make the images more vivid) that were taken by the stereo camera 195.

The disparity calculator 420 receives the stereo images signal-processed by the image preprocessor 410, performs stereo matching for the received stereo images, and acquires a disparity map based on the stereo matching. For example, the disparity calculator 420 may acquire disparity information of stereo images for a view in a direction ahead of the vehicle.

The stereo matching may be performed on a per pixel basis or a per predetermined block basis of the stereo images. In some implementations, the disparity map may include a map showing binocular parallax information of stereo images, e.g., left and right images, as values.

The segmentation unit 432 may perform segmentation and clustering for at least one of the stereo images based on the disparity information from the disparity calculator 420.

In some cases, the segmentation unit 432 may segment at least one of the stereo images into a background and a foreground based on the disparity information.

For example, a region of the image in which the disparity information in the disparity map is less than or equal to a predetermined value may be determined to be a background, and the calculated region may be excluded. As a result, a foreground may be relatively separated from the stereo images.

In another example, a region of the image in which the disparity information in the disparity map is greater than or equal to a predetermined value may be determined to be a foreground, and the calculated region may be extracted. As a result, the foreground may be separated from the stereo images.

As described in the examples above, the stereo images may be segmented into a background and a foreground based on the disparity information extracted based on the stereo images. Subsequently, therefore, signal processing speed and signal processing amount may be reduced during detection of an object.

The object detector 434 may detect an object based on the image segment from the segmentation unit 432.

As an example, the object detector 434 may detect an object for at least one of the stereo images based on the disparity information.

Specifically, the object detector 434 may detect an object for at least one of the stereo images. For example, the object detector 434 may detect an object from a foreground separated from the stereo image by the image segmentation.

Subsequently, the object verification unit 436 classifies and verifies the separated object.

To this end, the object verification unit 436 may use any suitable recognition method(s), such as a neural network, a support vector machine (SVM) method, a recognition method based on AdaBoost using a Haar-like feature, and/or a histograms of oriented gradients (HOG) method.

In some implementations, the object verification unit 436 may compare the detected object with objects stored in the first memory 140 to verify the detected object.

For example, the object verification unit 436 may verify various types of objects, such as an adjacent vehicle, a lane, a road surface, a traffic sign, a dangerous zone, a tunnel, etc., located around the vehicle.

The object tracking unit 440 tracks the verified object. For example, the object tracking unit 440 may verify an object in stereo images that have been sequentially acquired, calculate motion or a motion vector of the verified object, and track a movement of the object based on the calculated motion or the calculated motion vector. Consequently, the object tracking unit 440 may track various types of objects, such as an adjacent vehicle, a lane, a road surface, a traffic sign, a dangerous zone, a tunnel, etc., located around the vehicle.

Subsequently, the application unit 450 may perform processing to determine a risk to the vehicle 200 based on various objects, such as an adjacent vehicle, a lane, a road surface, and a traffic sign, that are located around the vehicle. In some implementations, the application unit 450 may further calculate a possibility of a rear-end collision with a preceding vehicle, slip of the vehicle, etc.

In addition, the application unit 450 may output a message informing a user of information regarding the determined risk to the vehicle. Such output information may be in the form of driver assistance information that is based on the calculated risk, the calculated possibility of the rear-end collision, and/or the calculated slip of the vehicle. Alternatively, the application unit 450 may create a control signal for attitude control or travel control of the vehicle 200 as vehicle control information.

FIG. 4B is an internal block diagram showing another example of a processor (e.g., the processor 170).

Referring to the example in FIG. 4B, the processor 170 is identical in construction to the processor 170 of FIG. 4A except that a signal processing sequence of the processor 170 of FIG. 4B is different from that of the processor 170 of FIG. 4A. Hereinafter, a description will be given of only the difference between the processor 170 of FIG. 4B and the processor 170 of FIG. 4A.

The object detector 434 may receive stereo images and detect an object for at least one of the stereo images. Unlike FIG. 4A, instead of detecting an object for an image segmented based on disparity information, the object detector 434 in FIG. 4B may directly detect an object from a stereo image.

Subsequently, the object verification unit 436 classifies and verifies the detected and separated object based on the image segment from the segmentation unit 432 and the object detected by the object detector 434.

To this end, the object verification unit 436 may use a suitable recognition method, such as a neural network, an SVM method, a recognition method based on AdaBoost using a Haar-like feature, and/or a HOG method.

FIGS. 5A and 5B are diagrams illustrating examples of an operation of a processor (e.g., the processor 170 shown in FIG. 4A) based on stereo images acquired from first and second frame periods.

Referring first to the example in FIG. 5A, the stereo camera 195 acquires stereo images during the first frame period.

The disparity calculator 420 of the processor 170 receives stereo images FR1a and FR1b signal-processed by the image preprocessor 410 and performs stereo matching for the received stereo images FR1a and FR1b to acquire a disparity map 520.

The disparity map 520 shows a disparity between the stereo images FR1a and FR1b as different levels. When a disparity level of a region (e.g., an object) in the image is higher, the distance from the region to the vehicle may be calculated as being smaller. When a disparity level is lower, on the other hand, the distance to the vehicle may be calculated as being greater.

As an example, the disparity map may be displayed with higher brightness when the disparity level is higher, and the disparity map may be displayed with lower brightness when the disparity level is lower. In such cases, a distance to an object around the vehicle may be determined based on the brightness of the corresponding region in the disparity map of the image.

FIG. 5A shows, by way of example, that, in the disparity map 520, first to fourth lanes 528a, 528b, 528c, and 528d have their own disparity levels, and a construction zone 522, a first preceding vehicle 524, and a second preceding vehicle 526 have their own disparity levels.

The segmentation unit 432, the object detector 434, and the object verification unit 436 may respectively perform segmentation, object detection, and object verification for at least one of the stereo images FR1a and FR1b based on the disparity map 520.

FIG. 5A shows, by way of example, that object detection and verification for the second stereo image FR1b are performed using the disparity map 520.

For example, object detection and verification for first to fourth lanes 538a, 538b, 538c, and 538d, a construction zone 532, a first preceding vehicle 534, and a second preceding vehicle 536 in an image 530 may be performed.

In some implementations, the disparity levels may be used to determine distances to objects in the image. In the example of FIG. 5A, distances to the construction zone 532, the first preceding vehicle 534, and the second preceding vehicle 536 may be calculated to be 12.0 m, 13.5 m, and 55.8 m, respectively.

Referring now to the example in FIG. 5B, the stereo camera 195 acquires stereo images during the second frame period.

The disparity calculator 420 of the processor 170 receives stereo images FR2a and FR2b signal-processed by the image preprocessor 410 and performs stereo matching for the received stereo images FR2a and FR2b to acquire a disparity map 540.

FIG. 5B shows, by way of example, that, in the disparity map 540, first to fourth lanes 548a, 548b, 548c, and 548d have their own disparity levels, and a construction zone 542, a first preceding vehicle 544, and a second preceding vehicle 546 have their own disparity levels.

The segmentation unit 432, the object detector 434, and the object verification unit 436 respectively perform segmentation, object detection, and object verification for at least one of the stereo images FR2a and FR2b based on the disparity map 540.

FIG. 5B shows, by way of example, that object detection and verification for the second stereo image FR2b are performed using the disparity map 540.

For example, object detection and verification for first to fourth lanes 558a, 558b, 558c, and 558d, a construction zone 552, a first preceding vehicle 554, and a second preceding vehicle 556 in an image 550 may be performed.

In some implementations, the disparity levels may be used to determine distances to objects in the image. In the example of FIG. 5B, a distance 553 to the construction zone 532, a distance 555 to the first preceding vehicle 534, and a distance 557 to the second preceding vehicle 536 may be calculated to be 12.0 m, 13.5 m, and 55.8 m, respectively.

The object tracking unit 440 may track the objects verified based on a comparison between FIGS. 5A and 5B.

Specifically, the object tracking unit 440 may track movement of the objects verified in FIGS. 5A and 5B based on motion or motion vectors of the objects. Consequently, in the example of FIGS. 5A and 5B, the object tracking unit 440 may track the lanes, the construction zone, the first preceding vehicle, and the second preceding vehicle located around the vehicle.

Figure 6A:
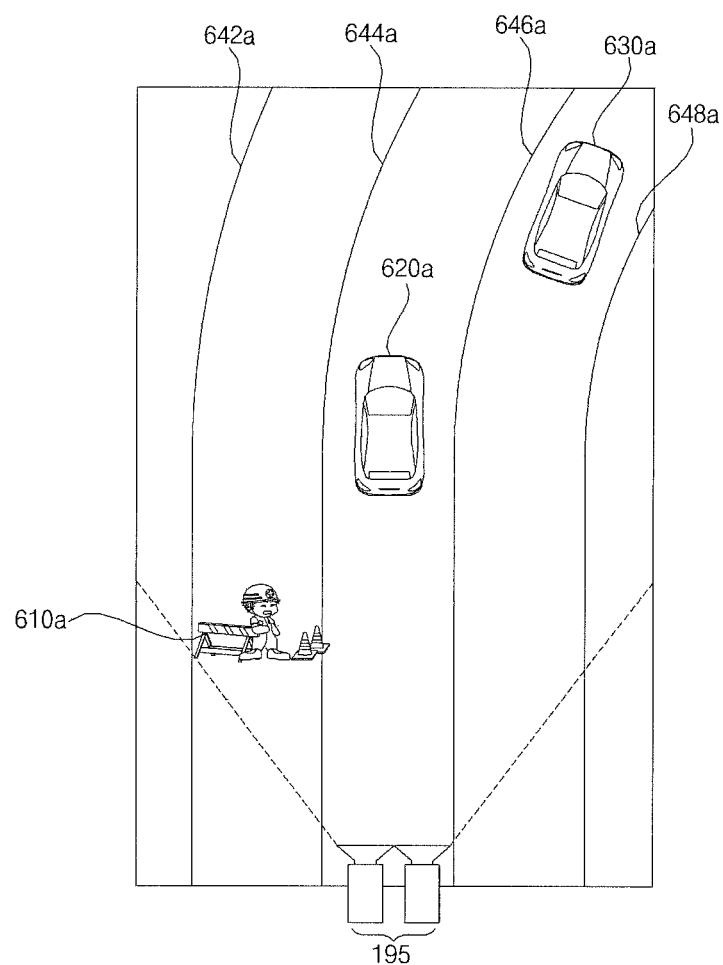
FIGS. 6A and 6B are diagrams illustrating examples of operations of a driver assistance apparatus.
Figure 6B:
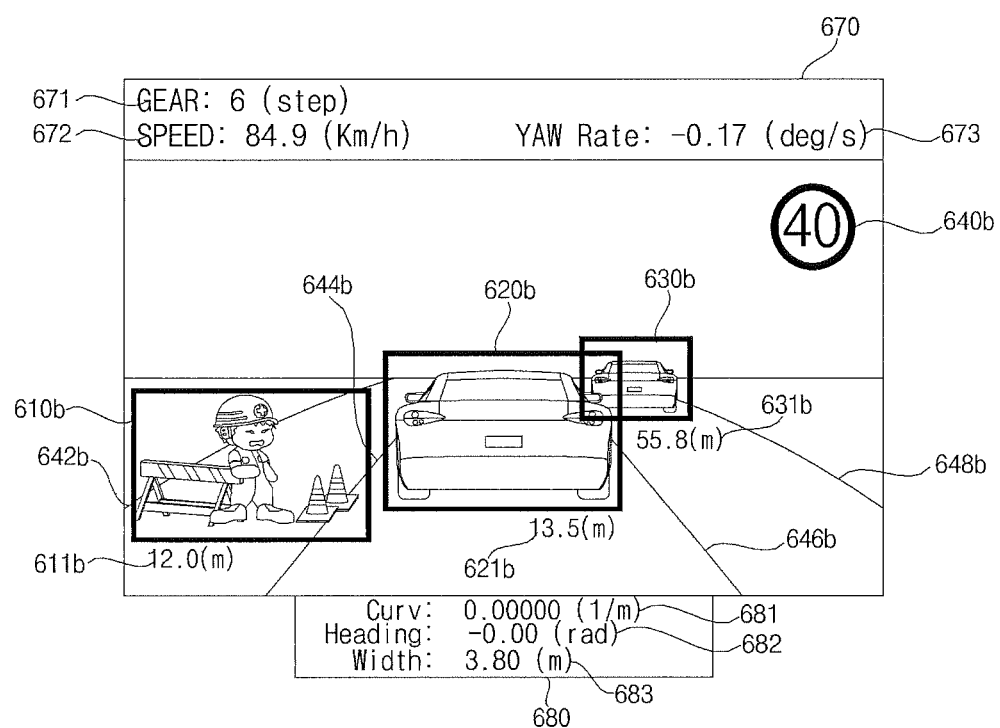

FIGS. 6A and 6B are reference views illustrating examples of an operation of a driver assistance apparatus (e.g., the driver assistance apparatus shown in FIG. 3).

FIG. 6A is a view showing, by way of example, a state ahead of the vehicle taken by the stereo camera 195 provided in the vehicle. In this example, the state ahead of the vehicle is displayed as a bird's eye view.

Referring to FIG. 6A, a first lane 642a, a second lane 644a, a third lane 646a, and a fourth lane 648a are arranged from the left side to the right side of the image. A construction zone 610a is located between the first lane 642a and the second lane 644a. A first preceding vehicle 620a is located between the second lane 644a and the third lane 646a. A second preceding vehicle 630a is located between the third lane 646a and the fourth lane 648a.

FIG. 6B is a view showing, by way of example, a state ahead of the vehicle acquired by the driver assistance apparatus together with various kinds of information. In particular, an image as shown in FIG. 6B may be displayed on the display unit 180 of the driver assistance apparatus or on the AVN apparatus 400.

FIG. 6B shows, by way of example, that information is displayed based on images taken by the stereo camera 195 unlike FIG. 6A.

Referring to FIG. 6B, a first lane 642b, a second lane 644b, a third lane 646b, and a fourth lane 648b are arranged from the left side to the right side of the image. A construction zone 610b is located between the first lane 642b and the second lane 644b. A first preceding vehicle 620b is located between the second lane 644b and the third lane 646b. A second preceding vehicle 630b is located between the third lane 646b and the fourth lane 648b.

The driver assistance apparatus 100 may perform signal processing based on stereo images taken by the stereo camera 195 to verify objects for the construction zone 610b, the first preceding vehicle 620b, and the second preceding vehicle 630b. In addition, the driver assistance apparatus 100 may verify the first lane 642b, the second lane 644b, the third lane 646b, and the fourth lane 648b.

FIG. 6B shows, by way of example, that, in order to indicate that the objects for the construction zone 610b, the first preceding vehicle 620b, and the second preceding vehicle 630b have been verified, borders of the objects are highlighted.

In some implementations, the driver assistance apparatus 100 may calculate distance information for the construction zone 610b, the first preceding vehicle 620b, and the second preceding vehicle 630b based on stereo images taken by the stereo camera 195.

FIG. 6B shows, by way of example, that calculated first distance information 611b, calculated second distance information 621b, and calculated third distance information 631b respectively corresponding to the construction zone 610b, the first preceding vehicle 620b, and the second preceding vehicle 630b are displayed.

The driver assistance apparatus 100 may receive sensor information for the vehicle from the control unit 770 and/or the sensor unit 760. In particular, the driver assistance apparatus 100 may receive and display vehicle speed information, gear information, yaw rate information indicating a speed at which a rotational angle (yaw angle) of the vehicle is changed, and/or vehicle angle information.

FIG. 6B shows, by way of example, that vehicle speed information 672, gear information 671, and yaw rate information 673 are displayed at a portion 670 above the image ahead of the vehicle, and vehicle angle information 682 is displayed at a portion 680 under the image ahead of the vehicle. However, other types of information may be displayed in the image, and implementations are not limited to the above examples. For example, in some cases, vehicle width information 683 and road curvature information 681 may be displayed together with the vehicle angle information 682.

In some implementations, the driver assistance apparatus 100 may receive speed limit information for a road on which the vehicle is traveling through the communication unit 120 or the interface unit 130. FIG. 6B shows, by way of example, that speed limit information 640b is displayed.

The driver assistance apparatus 100 may display various types of information shown in FIG. 6B through the display unit 180. Alternatively, the driver assistance apparatus 100 may store various types of information without additionally displaying the information. In addition, the driver assistance apparatus 100 may utilize the information in various applications.

Figure 7:
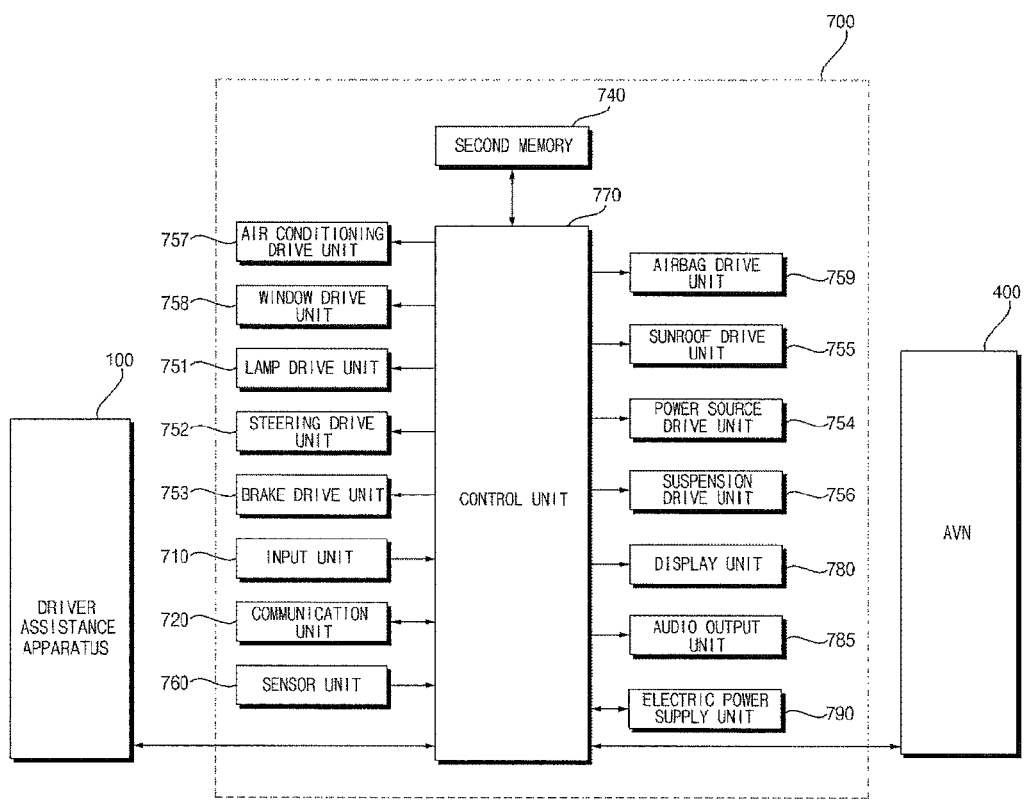
FIG. 7 is an internal block diagram illustrating an example of an electronic control apparatus in a vehicle.

FIG. 7 is an internal block diagram showing an example of an electronic control apparatus in a vehicle (e.g., the vehicle shown in FIG. 1).

Referring to the example in FIG. 7, the vehicle 200 may include an electronic control apparatus 700 for vehicle control. The electronic control apparatus 700 may exchange data with the driver assistance apparatus 100 and the AVN apparatus 400.

The electronic control apparatus 700 may include an input unit 710, a communication unit 720, a second memory 740, a lamp drive unit 751, a steering drive unit 752, a brake drive unit 753, a power source drive unit 754, a sunroof drive unit 755, a suspension drive unit 756, an air conditioning drive unit 757, a window drive unit 758, an airbag drive unit 759, a sensor unit 760, a control unit 770, a display unit 780, an audio output unit 785, and an electric power supply unit 790.

The input unit 710 may include an appropriate user interface, such as a plurality of buttons or a touchscreen, provided in the vehicle 200. Various input operations may be executed through interface, e.g., the buttons or the touchscreen.

The communication unit 720 may exchange data with the mobile terminal 600 or the server 500, e.g., in a wireless fashion. As a particular example, the communication unit 720 may exchange data with a mobile terminal of the driver in a wireless fashion. To this end, various wireless data communication protocols, such as Bluetooth, Wi-Fi, Wi-Fi Direct, and/or APiX, may be used.

The communication unit 720 may receive various types of information, such as weather information and/or road traffic state information, such as TPEG information, from the mobile terminal 600 or the server 500.

When a user gets into the vehicle, a mobile terminal 600 of the user may pair with the electronic control apparatus 700 automatically or by the user executing an application.

The second memory 740 may store various data for overall operation of the electronic control apparatus 700, such as programs for processing or control of the control unit 770.

The second memory 740 may be electrically connected to the control unit 770 to store basic data for the units, control data to control operations of the units, and input and output data. The second memory 740 may be one of various storage devices, such as a ROM, a RAM, an EPROM, a flash drive, and a hard drive.

The lamp drive unit 751 may control turn on/turn off of lamps provided inside and outside the vehicle. In addition, the lamp drive unit 751 may control intensity, direction, etc. of light emitted from each lamp. For example, the lamp drive unit 751 may control a direction indicating lamp, a brake lamp, etc.

The steering drive unit 752 may electronically control a steering apparatus (not shown) in the vehicle 200. Consequently, the steering drive unit 752 may change a heading of the vehicle.

The brake drive unit 753 may electronically control a brake apparatus (not shown) in the vehicle 200. For example, the brake drive unit 753 may control an operation of a brake mounted at each wheel to reduce speed of the vehicle 200. In another example, the brake drive unit 753 may differently control operations of brakes mounted at left wheels and right wheels to adjust the heading of the vehicle 200 to the left or the right.

The power source drive unit 754 may electronically control a power source in the vehicle 200.

For example, in a case in which the power source is an engine (not shown) using fossil fuel, the power source drive unit 754 may electronically control the engine. Consequently, the power source drive unit 754 may control output torque of the engine. In a case in which the power source is the engine, the power source drive unit 754 may restrict output torque of the engine to limit the vehicle speed under control of the control unit 770.

In another example, in a case in which the power source is an electric motor (not shown), the power source drive unit 754 may control the motor. Consequently, the power source drive unit 754 may control rotational speed and torque of the motor.

The sunroof drive unit 755 may electronically control a sunroof apparatus (not shown) in the vehicle 200. For example, the sunroof drive unit 755 may control a sunroof to be opened or closed.

The suspension drive unit 756 may electronically control a suspension apparatus (not shown) in the vehicle 200. For example, in a case in which a road surface is uneven, the suspension drive unit 756 may control the suspension apparatus to reduce vibration of the vehicle 200.

The air conditioning drive unit 757 may electronically control an air conditioner (not shown) in the vehicle 200. For example, in a case in which the internal temperature of the vehicle is high, the air conditioning drive unit 757 may control the air conditioner to supply cool air into the vehicle.

The window drive unit 758 may electronically control a window apparatus (not shown) in the vehicle 200. For example, the window drive unit 758 may control left and right side windows of the vehicle to be opened or closed.

The airbag drive unit 759 may electronically control an airbag apparatus (not shown) in the vehicle 200. For example, the airbag drive unit 759 may control an airbag to deploy in a dangerous situation.

The sensor unit 760 senses a signal related to travel of the vehicle 200. To this end, the sensor unit 760 may include a heading sensor, a yaw sensor, a gyro sensor, a position module, a vehicle forward movement/backward movement sensor, a wheel sensor, a vehicle speed sensor, a vehicle body tilt sensor, a battery sensor, a fuel sensor, a tire sensor, a steering sensor, an in-vehicle temperature sensor, and an in-vehicle humidity sensor.

Consequently, the sensor unit 760 may acquire a sensing signal for vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, or in-vehicle humidity information.

In addition, the sensor unit 760 may further include an acceleration pedal sensor, a pressure sensor, an engine speed sensor, an air flow sensor (AFS), an intake air temperature sensor (ATS), a water temperature sensor (WTS), a throttle position sensor (TPS), a top dead center (TDC) sensor, and a crank angle sensor (CAS).

The control unit 770 may control overall operation of each unit in the electronic control apparatus 700. The control unit 770 may be an electronic control unit (ECU).

The control unit 770 may execute a specific operation based on an input through the input unit 710, receive and transmit a signal sensed by the sensor unit 760 to the driver assistance apparatus 100, receive map information from the AVN apparatus 400, or control operations of the respective drive units 751, 752, 753, 754, and 756.

In addition, the control unit 770 may receive weather information and road traffic state information, such as TPEG information, from the communication unit 720.

The display unit 780 may display an image related to the operation of the driver assistance apparatus. In order to display such an image, the display unit 780 may include a cluster or an HUD provided at the inside front of the vehicle. In a case in which the display unit 180 is the HUD, the display unit 180 may include a projection module to project an image on the windshield of the vehicle 200. On the other hand, the display unit 780 may include a touchscreen to allow an input by tapping on the screen.

The audio output unit 785 converts an electric signal received from the control unit 770 into an audio signal and outputs the audio signal. To this end, the audio output unit 785 may include a speaker. The audio output unit 785 may output a sound corresponding to an operation of the input unit 710, e.g. a button.

The electric power supply unit 790 may supply electric power to the respective components under control of the control unit 770. In particular, electric power from an in-vehicle battery (not shown) may be supplied to the electric power supply unit 790.

Figure 8A:
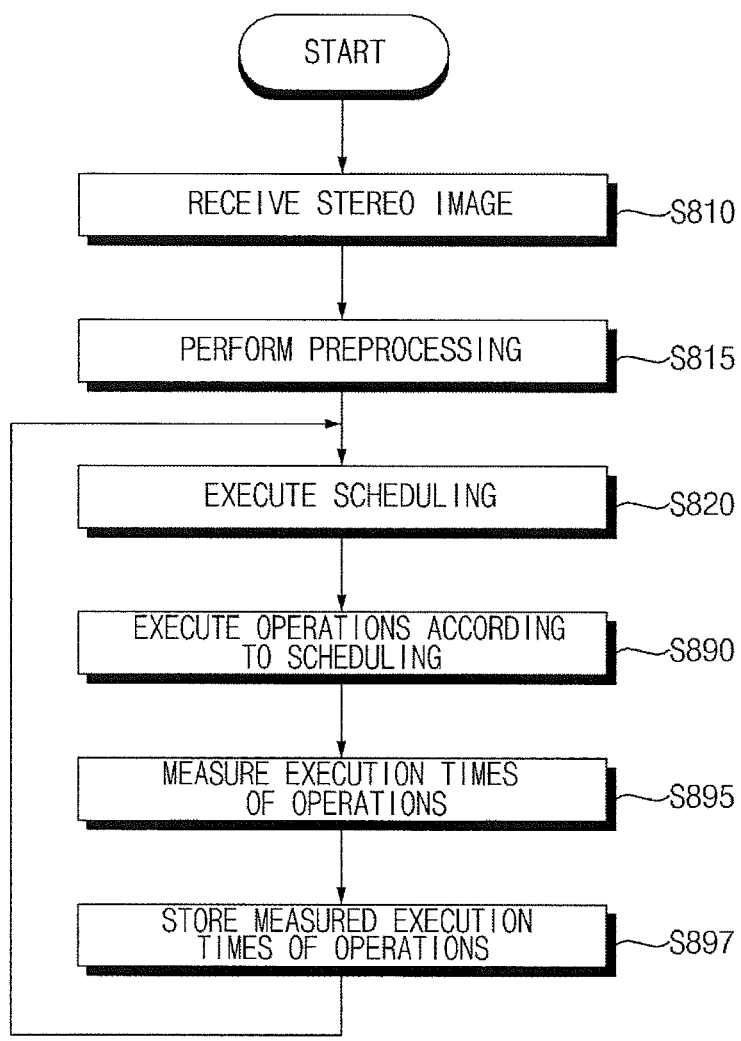
FIGS. 8A and 8B are flowcharts illustrating examples of operations of a driver assistance apparatus.
Figure 8B:
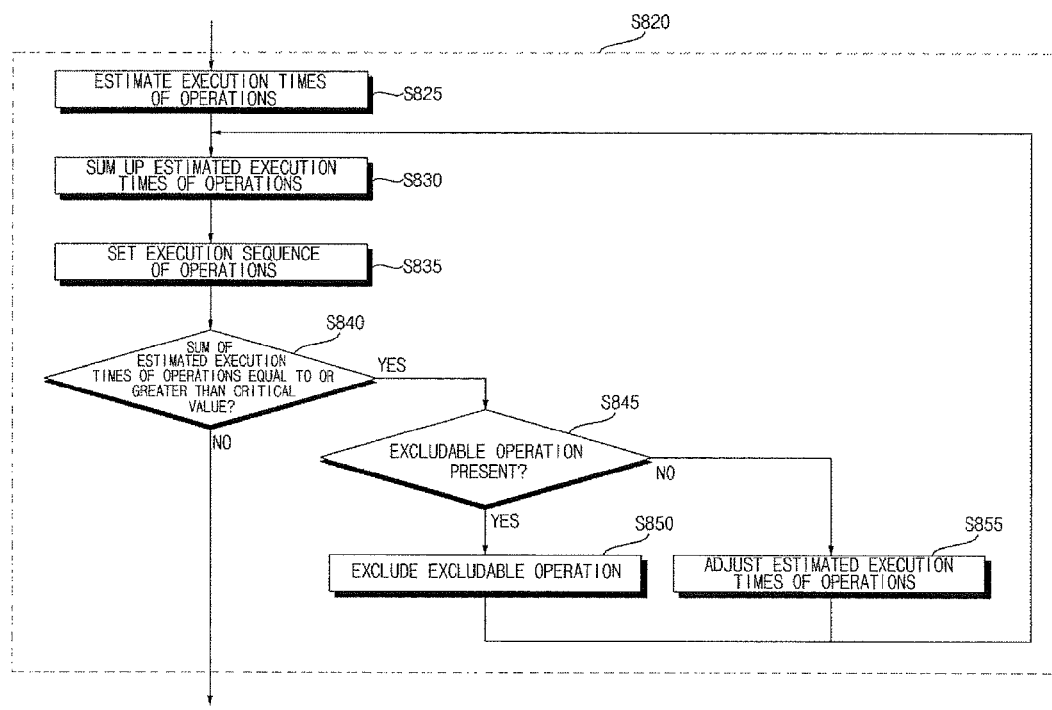

FIGS. 8A and 8B are flowcharts illustrating examples of an operation of a driver assistance apparatus.

Referring to the example in FIG. 8A, the processor 170 receives stereo images (S810). The stereo images may have a plurality of frames. The stereo camera 195 of the driver assistance apparatus may acquire (e.g., continuously) stereo images, and the processor 170 may receive (e.g., continuously) the stereo images from the stereo camera 195. For example, the processor 170 may receive a first frame. Subsequently, the processor 170 may receive a second frame. Subsequently, the processor 170 may receive a third frame. The first to third frames may be stereo images transmitted from the stereo camera 195 to the processor 170, e.g., in acquired order. The first to third frames are received (e.g., sequentially) by the processor 170 over time, which, however, may not necessarily mean that the second frame is received after the first frame, and the third frame is received after the second frame. In some implementations, at least one frame may be included between the first and second frames, and at least one frame may be included between the second and third frames.

Upon receiving the stereo images, the processor 170 may perform preprocessing for the received stereo images (S815).

For example, the processor 170 may perform various types of processing on the images, such as noise reduction, rectification, calibration, color enhancement, color space conversion (CSC), interpolation, and/or camera gain control for the stereo images. As a result, the processor 170 may perform processing on the stereo images to enhance the stereo images (e.g., make them more vivid) that were taken by the stereo camera 195.

In some implementations, the processor 170 may perform three-dimensional (3D) based preprocessing and/or two-dimensional (2D) based preprocessing. For example, the processor 170 may perform 3D based preprocessing. The 3D based preprocessing may be used to detect a distance to a specific object. In addition, the processor 170 may perform 2D based preprocessing. The 2D based preprocessing may be used to detect an object. The processor 170 may appropriately select the 3D or 2D based preprocessing. Alternatively, the processor 170 may combine the 3D based preprocessing and the 2D based preprocessing.

Preprocessing may be performed by the image preprocessor 410 of the processor 170.

After preprocessing, the processor 170 may perform processing for the images that have been captured by the stereo camera 195. For example, the processor 170 may execute one or more operations for a frame, as described above.

In some implementations, the processor 170 may determine and execute a scheduling for a plurality of operations (S820). For example, scheduling may be an operation to estimate execution times of the operations and to set an execution sequence of the operations. In some implementations, scheduling may involve assigning different execution times to different operations, such that each operation is to be executed by the processor 170 within the assigned execution time. The processor 170 may assign the different execution times based on measured execution times of the operations that have been executed in the past. The measured execution times may be execution times measured at step S895. Alternatively, the measured execution times may be execution times stored in the DB 141 at step S897.

In some implementations, the scheduling of operations in each frame may be based on measured execution times of operations that were executed in the previous frame.

As an illustrative example, the processor 170 may receive a first frame from the stereo camera 195 and determine a first scheduling for a plurality of operations in the first frame. For example, the processor 170 may determine the first scheduling by assigning an execution time to each operation in the plurality of operations for the first frame, and in some implementations may also determine an order of executing the plurality of operations for the first frame. The processor 170 may execute a plurality of operations for the first frame according to the first scheduling and measure the execution times of the operations for the first frame.

Subsequently, the processor 170 may receive a second frame from the stereo camera 195 and determine a second scheduling for the operations in the second frame. In some implementations, the second scheduling may be determined based on the measured execution times of the operations that were executed for the first frame. The processor 170 may execute the operations for the second frame according to the second scheduling and measure execution times of the operations.

The processor 170 may then receive a third frame from the stereo camera 195 and determine a third scheduling for the operations in the third frame. In some implementations, the third scheduling may be determined based on the measured execution times of the operations that were executed for the second frame.

As such, the processor 170 may determine the scheduling of operations in a particular frame based on the measured execution times of operations that were executed in the previous frame.

In some implementations, the processor 170 may additionally determine a variation between measured execution times of a particular operation that was executed in successive frames. For example, after determining a scheduling for a particular frame, executing the operations according to the determined scheduling, and measuring execution times of the operations, the processor 170 may additionally determine a variation of the measured execution time for a particular operation between the current frame and the previous frame For example, in a first frame, the processor 170 may execute a first operation according to a first scheduling and measure a first execution time of the first operation in the first frame. Subsequently, in a second frame, the processor 170 may execute the first operation according to a second scheduling and measure a second execution time of the first operation in the second frame. Subsequently, the processor 170 may calculate a variation in execution time of the first operation based on the first execution time of the first operation according to the first scheduling and second the execution time of the first operation according to the second scheduling.

This process may be repeated for each operation in a plurality of operations that are executed in different frames. As such, in some implementations, a variation in execution time between frames may be determined for each operation in a plurality of operations that are executed in the frames.

In some implementations, the processor 170 may take into account the variations of execution times of operations that were executed in previous frames to determine a scheduling for a subsequent frame. As such, processor 170 may determine a scheduling for operations in a subsequent frame based not only on the measured execution times for the operations in the immediately preceding frame, but also based on a variation in execution times for the operations in multiple previous frames. For example, the processor 170 may determine variations in execution time for a plurality of operations executed in multiple previous frames, and then add those variations to the measured execution times from the immediately preceding frame. Subsequently, the processor 170 may set an execution sequence of the operations in the subsequent frame.

The scheduling may be executed by the scheduling unit 910 of the processor 170. Specifically, an execution time estimation unit 913 of the scheduling unit 910 may estimate execution times of a plurality of operations. An execution sequence setting unit 915 of the scheduling unit 910 may set an execution sequence of the operations.

The scheduling will hereinafter be described in detail with reference to the example FIG. 8B.

Upon completion of the scheduling, the processor 170 may execute a plurality of operations according to the scheduling (S890). The operations may be executed by an operation execution unit 930.

For example, the operation execution unit 930 may execute a first operation 931, a second operation 932, and a third operation 933 according to the first scheduling in the first frame. In addition, the operation execution unit 930 may execute a first operation 931, a second operation 932, and a third operation 933 according to the second scheduling in the second frame. Furthermore, the operation execution unit 930 may execute a first operation 931, a second operation 932, and a third operation 933 according to the third scheduling in the third frame.

Upon completion of the operations according to the schedulings, the processor 170 may measure execution times of the operations (S895).

For example, the processor 170 may measure an execution time of the first operation according to the first scheduling in the first frame. In addition, the processor 170 may measure an execution time of the first operation according to the second scheduling in the second frame. Furthermore, the processor 170 may measure an execution time of the first operation according to the third scheduling in the third frame.

In another example, the processor 170 may measure an execution time of the second operation according to the first scheduling in the first frame. In addition, the processor 170 may measure an execution time of the second operation according to the second scheduling in the second frame. Furthermore, the processor 170 may measure an execution time of the second operation according to the third scheduling in the third frame.

In a further example, the processor 170 may measure an execution time of the third operation according to the first scheduling in the first frame. In addition, the processor 170 may measure an execution time of the third operation according to the second scheduling in the second frame. Furthermore, the processor 170 may measure an execution time of the third operation according to the third scheduling in the third frame.

The execution times of the operations may be measured by an execution time measurement unit 950.

Upon completion of the measurement of the execution times of the operations, the processor 170 may store the measured execution times of the operations in the DB 141 (S897). In some implementations, the DB 141 may include a predetermined database provided in the first memory 140.

For example, the processor 170 may store in the DB 141 the execution times of the first to third operations measured in the first frame. In another example, the processor 170 may store in the DB 141 the execution times of the first to third operations measured in the second frame. In a further example, the processor 170 may store in the DB 141 the execution times of the first to third operations measured in the third frame.

FIG. 8B is a detailed flowchart showing an example of step S820 of FIG. 8A.

Referring to FIG. 8B, the processor 170 may estimate execution times of a plurality of operations after the pre-processing has been performed (S825).

The processor 170 may estimate execution times of a plurality of operations in the next frame based on execution times of a plurality of operations measured in the previous frame.

In accordance with a first implementation, the processor 170 may estimate execution times of a plurality of operations in a second frame based on execution times of a plurality of operations measured in a first frame. The processor 170 may estimate execution times of a plurality of operations in a third frame based on execution times of the operations measured in the second frame.

In accordance with a second implementation, the processor 170 may measure execution times of a plurality of operations according to a first scheduling. Subsequently, the processor 170 may measure execution times of a plurality of operations according to a second scheduling. Subsequently, the processor 170 may calculate a variation in execution time of each operation based on the measured execution times of the operations according to the first scheduling and the measured execution times of the operations according to the second scheduling. Subsequently, in a case in which a third scheduling for a plurality of operations is executed in a third frame, the processor 170 may reflect a variation in execution time of each operation. For example, the processor 170 may add variations in execution times of the operations to the measured execution times of the operations according to the second scheduling to estimate the execution times of the operations.

In some implementations, the variations in execution times of the operations may be continuously calculated. For example, the processor 170 may calculate variations in execution times of the operations in the first and second frames. In addition, the processor 170 may calculate variations in execution times of the operations in the second and third frames. Furthermore, the processor 170 may calculate variations in execution times of the operations in the third and fourth frames. In this case, the variation in execution time of each operation may have a minimum value, a maximum value, and a mean value. According to some implementations, the processor 170 may estimate execution times of a plurality of operations based on the maximum values of the variations in execution times of the operations which have been cumulatively stored. In this case, there may be a low probability that an error will occur in estimation of the execution times of the operations.

In accordance with the first implementation, the processor 170 may measure an execution time of a first operation according to a first scheduling. Subsequently, during execution of a second scheduling, the processor 170 may estimate an execution time of a first operation in a second frame based on the measured execution time of the first operation according to the first scheduling. In addition, the processor 170 may measure an execution time of a first operation according to the second scheduling. Subsequently, during execution of a third scheduling, the processor 170 may estimate an execution time of a first operation in a third frame based on the measured execution time of the first operation according to the second scheduling.

In accordance with the second implementation, the processor 170 may measure an execution time of a first operation according to a first scheduling. In addition, the processor 170 may measure an execution time of a first operation according to a second scheduling. Subsequently, the processor 170 may calculate a variation in execution time of the first operation based on the execution time of the first operation according to the first scheduling and the execution time of the first operation according to the second scheduling. Subsequently, the processor 170 may add the variation in execution time of the first operation to the execution time of the first operation according to the second scheduling to estimate an execution time of a first operation in a third scheduling.

In accordance with the first implementation, the processor 170 may measure an execution time of a second operation according to the first scheduling. Subsequently, during execution of the second scheduling, the processor 170 may estimate an execution time of a second operation in the second frame based on the measured execution time of the second operation according to the first scheduling. In addition, the processor 170 may measure an execution time of a second operation according to the second scheduling. Subsequently, during execution of the third scheduling, the processor 170 may estimate an execution time of a second operation in the third frame based on the measured execution time of the second operation according to the second scheduling.

In accordance with the second implementation, the processor 170 may measure an execution time of a second operation according to the first scheduling. In addition, the processor 170 may measure an execution time of a second operation according to the second scheduling. Subsequently, the processor 170 may calculate a variation in execution time of the second operation based on the execution time of the second operation according to the first scheduling and the execution time of the second operation according to the second scheduling. Subsequently, the processor 170 may add the variation in execution time of the second operation to the execution time of the second operation according to the second scheduling to estimate an execution time of a second operation in the third scheduling.

In accordance with the first implementation, the processor 170 may measure an execution time of a third operation according to the first scheduling. Subsequently, during execution of the second scheduling, the processor 170 may estimate an execution time of a third operation in the second frame based on the measured execution time of the third operation according to the first scheduling. In addition, the processor 170 may measure an execution time of a third operation according to the second scheduling. Subsequently, during execution of the third scheduling, the processor 170 may estimate an execution time of a third operation in the third frame based on the measured execution time of the third operation according to the second scheduling.

In accordance with the second implementation, the processor 170 may measure an execution time of a third operation according to the first scheduling. In addition, the processor 170 may measure an execution time of a third operation according to the second scheduling. Subsequently, the processor 170 may calculate a variation in execution time of the third operation based on the execution time of the third operation according to the first scheduling and the execution time of the third operation according to the second scheduling. Subsequently, the processor 170 may add the variation in execution time of the third operation to the execution time of the third operation according to the second scheduling to estimate an execution time of a third operation in the third scheduling.

The processor 170 may estimate the execution time of the first operation within a range equal to or greater than a reference time. The first operation may be a requisite one of the operations, e.g., an operation that is important or required for operation of the vehicle. In some scenarios, the first operation may be one that yields less useful (e.g., less accurate) results when not executed for a duration of at least the reference time or more. For example, in a case in which pedestrian detection is performed during a time less than a threshold value (e.g., 25 msec), such detection may not yield sufficiently accurate results. In this case, the processor 170 may estimate the pedestrian detection over a duration equal to or greater than 25 msec.

After estimation of the execution times of the operations, the processor 170 may sum the estimated execution times of the operations (S830) to determine a total execution time for completing the operations. For example, the processor 170 may sum the estimated execution times of the first to third operations.

Subsequently, in some implementations, the processor 170 may set an execution sequence (e.g., a priority) of the operations (S835).

For example, the processor 170 may set which of the first to third operations will be executed with higher priority and which of the first to third operations will be executed with lower priority according to a predetermined criterion.

The execution sequence may be set such that the operations can be executed with a priority that depends on the execution times of the operations estimated at step S825. For example, in a case in which the estimated execution times of the first, second, and third operations are sequentially longer, the processor 170 may set the execution sequence in order of the first, second, and third operations. In this case, an operation having a shorter estimated execution time is executed first, whereby it is possible to reduce average delay and execute more operations within a limited time.

The execution sequence may be set by reflecting a travel environment or external environment of the vehicle. The processor 170 may determine the travel environment or the external environment based on stereo images received from the stereo camera 195. Alternatively or additionally, the processor 170 may determine the travel environment or the external environment based on the sensor information received through the interface unit 130. The travel environment may be any one selected from among various roads, such as an expressway, a national road, a country road, and a downtown road, on which the vehicle is traveling. On the other hand, the external environment may be any one selected from among a state of a section in which the vehicle is traveling, a state of weather during traveling of the vehicle, and a traveling time of the vehicle.

The execution sequence may, in some cases, be set by default. For example, before execution times of a plurality of operations are measured, the processor 170 may set the execution sequence by default. In some implementations, in a case in which it is not possible to measure execution times of a plurality of operations in the previous frame, the processor 170 may set the execution sequence by default. For example, in a case in which the execution sequence is set for the first time or the execution sequence is set after the occurrence of an error, the processor 170 may set the execution sequence by default. Alternatively or additionally, the processor 170 may set the execution sequence by default under a predetermined environment. For example, in a case in which the external environment of the vehicle is any one selected from among a tunnel entrance or exit, a sunrise or sunset time, and a rainy or snowy weather, the processor 170 may set the execution sequence by default.

In a case in which one of the operations is an important or required operation for operation of the vehicle, the processor 170 may set the requisite operation as one of highest priority. For example, in a case in which the first operation is an operation related to safe running of the vehicle, the processor 170 may set the first operation as one of highest priority. In another example, the processor 170 may set the pedestrian detection, which is related to safety of pedestrians, as one of highest priority. The first memory 140 may prestore a list of requisite operations. The processor 170 may preset priority of the execution sequence based on the list stored in the first memory 140 and then set a subsequent execution sequence.

In some implementations, in a case in which there is any requisite one of the operations in the second frame, the processor 170 may set the requisite operation as one of highest priority. For example, in a case in which the first operation in the second frame is an operation related to safe running of the vehicle, the processor 170 may set the first operation as one of highest priority. Subsequently, in a case in which the processor 170 receives the third frame from the stereo camera 195 and executes the third scheduling for the first to third operations, the processor 170 may set the first operation as one of highest priority.

After the execution sequence of the operations is set, the processor 170 may determine whether the sum of the estimated execution times of the operations is equal to or greater than a critical value (S840). The critical value may be a maximum threshold value of time that is available for the processor 170 to perform processing. For example, the critical value of execution time may be a total available time during which a single frame is to be processed by the processor 170 before the next frame is to be processed. The critical value may depend on various factors, such as an image capturing speed of the stereo camera 195, an image resolution level of the stereo camera 195, a processing speed of the processor 170, etc.

For a plurality of continuously received frames, the processor 170 may be configured to process frames sequentially, such that the processor 170 processes the current frame before the next frame is received and processed. In this case, the critical value may represent a maximum available time for the processor 170 to complete processing the current frame before the next frame is received. For example, if a plurality of operations is to be executed in a second frame after a plurality of operations is executed in a first frame, then the processor 170 may be configured to execute operations of the first frame before the second frame is received. In this case, the critical value may represent a maximum available time for the processor 170 to execute the plurality of operations in the first frame before the second frame is received.

In some implementations, the processor 170 may predict an estimated execution time of an operation, and thus determine whether the operation can be completed within a critical time of the current frame.

If the processor 170 determines that the sum of the estimated execution times of a plurality of operations is less than the critical value of the current frame, the processor 170 may execute a plurality of operations according to scheduling (S890).

If the processor 170 predicts that the total estimated execution times of operations for a frame does not satisfy the critical value for the frame, then the processor 170 may proactively take action to reduce the total execution time of the operations For example, if the processor 170 determines that the sum of the estimated execution times of the operations in a frame is equal to or greater than the critical value, then the processor 170 may determine whether there is any operation that can be excluded from the operations (S845). For example, the processor 170 may determine whether there is any operation that can be excluded from first to third operations.

Upon determining that there is an excludable operation, the processor 170 may exclude the operation determined to be excludable (S850). For example, upon determining that the first operation is excludable, the processor 170 may exclude the first operation. As a specific example, in a case in which the vehicle is traveling on an expressway, pedestrian detection may be excluded. In a case in which the sum of the estimated execution times of the operations is equal to or greater than the critical value in this situation, the processor 170 may determine that the pedestrian detection is an excludable operation.

In some implementations, an excluded operation may be executed with higher priority during scheduling in the next frame. For example, if a first operation is excluded from a second frame and the processor 170 receives a third frame and executes a third scheduling for first to third operations in the third frame, then the processor 170 may execute the first operation with higher priority.

In some implementations, an excluded operation may be executed with higher priority during scheduling in the next frame in consideration of the measured execution times of the other operations. For example, if a first operation is excluded from a second frame and the processor 170 receives a third frame and executes a third scheduling for first to third operations in the third frame, then the processor 170 may set the execution sequence in consideration of the execution times of the second and third operations. Specifically, in a case in which the execution time of one of the second and third operations is equal to or greater than a predetermined reference value, the processor 170 may determine that the operation having the execution time equal to or greater than the reference value is an important operation. In some cases, the processor 170 may execute the operation having the execution time equal to or greater than the reference value with higher priority than the first operation.

After exclusion of an operation determined to be excludable, the processor 170 may sum the estimated execution times of the operations (S825), set the execution sequence of the operations (S835), and determine whether the sum of the estimated execution times of the operations is equal to or greater than the critical value (S840).

In a case in which there is no excludable operation, the processor 170 may adjust the estimated execution times of the operations (S855). For example, the processor 170 may adjust the estimated execution time of at least one of the first to third operations. In a case in which the estimated execution time of the first operation is excessively longer than those of the second and third operations, the processor 170 may reduce the estimated execution time of the first operation. In a case in which the estimated execution times of the first to third operations are almost equal, the processor 170 may reduce the estimated execution times of the first to third operations.

After adjustment of the estimated execution times of the operations, the processor 170 may sum the estimated execution times of the operations (S825), set the execution sequence of the operations (S835), and determine whether the sum of the estimated execution times of the operations is equal to or greater than the critical value (S840).

Figure 9:
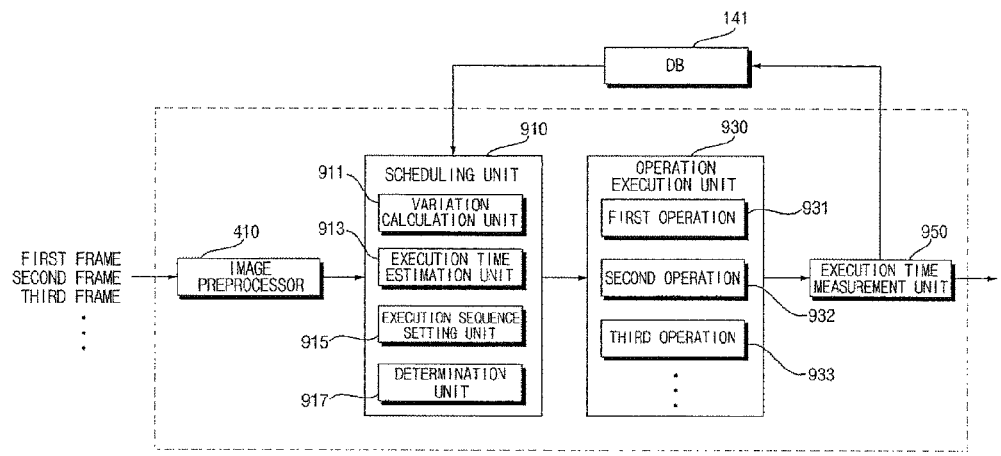
FIG. 9 is an internal block diagram illustrating an example of a processor provided in a driver assistance apparatus.

FIG. 9 is an internal block diagram of an example of processor provided to illustrate the driver assistance apparatus.

Referring to the example in FIG. 9, the processor 170 may include an image preprocessor 410, a scheduling unit 910, an operation execution unit 930, and an execution time measurement unit 950.

The processor 170 receives stereo images from the stereo camera 195. The stereo images may have a plurality of frames. The stereo camera 195 of the driver assistance apparatus may continuously acquire stereo images, and the processor 170 may continuously receive the stereo images from the stereo camera 195. For example, the processor 170 may receive a first frame. Subsequently, the processor 170 may receive a second frame. Subsequently, the processor 170 may receive a third frame. The first to third frames may be stereo images transmitted from the stereo camera 195 to the processor 170, e.g., in acquired order. The first to third frames are received, e.g., sequentially, by the processor 170 over time, which, however, may not mean that the second frame is necessarily received after the first frame, and that the third frame is necessarily received after the second frame. In some implementations, at least one frame may be included between the first and second frames, and at least one frame may be included between the second and third frames.

The image preprocessor 410 may receive the stereo images from the stereo camera 195 and perform preprocessing for the received stereo images.

For example, the processor 170 may perform processing on the stereo images, such as noise reduction, rectification, calibration, color enhancement, color space conversion (CSC), interpolation, and/or camera gain control for the stereo images. As a result, the processor 170 may enhance (e.g., make more vivid) the stereo images that were taken by the stereo camera 195.

In some implementations, the image preprocessor 410 may perform three-dimensional (3D) based preprocessing and/or two-dimensional (2D) based preprocessing. For example, the image preprocessor 410 may perform 3D based preprocessing. The 3D based preprocessing may be used to detect the distance to a specific object. In addition, the image preprocessor 410 may perform 2D based preprocessing. The 2D based preprocessing may be used to detect an object. The image preprocessor 410 may appropriately select the 3D or 2D based preprocessing. Alternatively, the image preprocessor 410 may combine the 3D based preprocessing and the 2D based preprocessing.

In some implementations, the scheduling unit 910 may execute scheduling for a plurality of operations. Scheduling may be an operation to estimate execution times of the operations and to set an execution sequence of the operations. The scheduling unit 910 may execute scheduling based on measured execution times of the operations. The measured execution times may be execution times measured by the execution time measurement unit 950. Alternatively or additionally, the measured execution times may be execution times stored in the DB 141.

For example, the scheduling unit 910 may receive a first frame and execute first scheduling for first to third operations in the first frame. Subsequently, the operation execution unit 930 may execute first to third operations according to the first scheduling. Subsequently, the execution time measurement unit 950 may measure execution times of the first to third operations according to the first scheduling. Subsequently, the scheduling unit 910 may receive a second frame and execute second scheduling for first to third operations in the second frame. In some cases, the scheduling unit 910 may execute the second scheduling based on the measured execution times of the first to third operations.

After execution of the second scheduling, in some implementations, the operation execution unit 930 may execute first to third operations according to the second scheduling. Subsequently, the execution time measurement unit 950 may measure execution times of the first to third operations according to the second scheduling. Subsequently, the scheduling unit 910 may calculate a variation in execution time of each of the first to third operations based on the measured execution times of the first to third operations according to the first scheduling and the measured execution times of the first to third operations according to the second scheduling.

Specifically, the scheduling unit 910 may include a variation calculation unit 911, an execution time estimation unit 913, an execution sequence setting unit 915, and a determination unit 917.

The variation calculation unit 911 may calculate a variation in execution time of each of a plurality of operations.

Specifically, the variation calculation unit 911 may calculate a variation in execution time of each of the operations based on the execution times of the operations according to the first scheduling and the execution times of the operations according to the second scheduling.

For example, the variation calculation unit 911 may calculate a variation in execution time of the first operation based on the execution time of the first operation according to the first scheduling and the execution time of the first operation according to the second scheduling.

In another example, the variation calculation unit 911 may calculate a variation in execution time of the second operation based on the execution time of the second operation according to the first scheduling and the execution time of the second operation according to the second scheduling.

In a further example, the variation calculation unit 911 may calculate a variation in execution time of the third operation based on the execution time of the third operation according to the first scheduling and the execution time of the third operation according to the second scheduling.

The variations in execution times of the operations may be cumulatively stored in the DB 141.

The variations in execution times of the operations may be continuously calculated. For example, the variation calculation unit 911 may calculate variations in execution times of the operations in the first and second frames. In addition, the variation calculation unit 911 may calculate variations in execution times of the operations in the second and third frames. Furthermore, the variation calculation unit 911 may calculate variations in execution times of the operations in the third and fourth frames. In this case, the variation in execution time of each operation may have a minimum value, a maximum value, and a mean value. According to some implementations, the variation calculation unit 911 may estimate execution times of a plurality of operations based on the maximum values of the variations in execution times of the operations which have been cumulatively stored. In this case, there may be a low probability that an error will occur in estimation of the execution times of the operations.

The execution time estimation unit 913 may estimate execution times of a plurality of operations.

The execution time estimation unit 913 may estimate execution times of a plurality of operations in the next frame based on execution times of a plurality of operations measured in the previous frame.

In accordance with a first implementation, the execution time estimation unit 913 may estimate execution times of a plurality of operations in a second frame based on execution times of a plurality of operations measured in a first frame. The execution time estimation unit 913 may estimate execution times of a plurality of operations in a third frame based on execution times of the operations measured in the second frame.

In accordance with a second implementation, the execution time measurement unit 950 may measure execution times of a plurality of operations according to a first scheduling. Subsequently, the execution time measurement unit 950 may measure execution times of a plurality of operations according to a second scheduling. Subsequently, the variation calculation unit 911 may calculate a variation in execution time of each operation based on the measured execution times of the operations according to the first scheduling and the measured execution times of the operations according to the second scheduling. Subsequently, in a case in which a third scheduling for a plurality of operations is executed in a third frame, the execution time estimation unit 913 may reflect a variation in execution time of each operation. For example, the execution time estimation unit 913 may add variations in execution times of the operations to the measured execution times of the operations according to the second scheduling to estimate the execution times of the operations.

In accordance with the first implementation, the execution time measurement unit 950 may measure an execution time of a first operation according to a first scheduling. Subsequently, during execution of a second scheduling, the execution time estimation unit 913 may estimate an execution time of a first operation in a second frame based on the measured execution time of the first operation according to the first scheduling. In addition, the execution time measurement unit 950 may measure an execution time of a first operation according to the second scheduling. Subsequently, during execution of a third scheduling, the execution time estimation unit 913 may estimate an execution time of a first operation in a third frame based on the measured execution time of the first operation according to the second scheduling.

In accordance with the second implementation, the execution time measurement unit 950 may measure an execution time of a first operation according to a first scheduling. In addition, the execution time measurement unit 950 may measure an execution time of a first operation according to a second scheduling. Subsequently, the variation calculation unit 911 may calculate a variation in execution time of the first operation based on the execution time of the first operation according to the first scheduling and the execution time of the first operation according to the second scheduling. Subsequently, the execution time estimation unit 913 may add the variation in execution time of the first operation to the execution time of the first operation according to the second scheduling to estimate an execution time of a first operation in a third scheduling.

In accordance with the first implementation, the execution time measurement unit 950 may measure an execution time of a second operation according to the first scheduling. Subsequently, during execution of the second scheduling, the execution time estimation unit 913 may estimate an execution time of a second operation in the second frame based on the measured execution time of the second operation according to the first scheduling. In addition, the execution time measurement unit 950 may measure an execution time of a second operation according to the second scheduling. Subsequently, during execution of the third scheduling, the execution time estimation unit 913 may estimate an execution time of a second operation in the third frame based on the measured execution time of the second operation according to the second scheduling.

In accordance with the second implementation, the execution time measurement unit 950 may measure an execution time of a second operation according to the first scheduling. In addition, the execution time measurement unit 950 may measure an execution time of a second operation according to the second scheduling. Subsequently, the variation calculation unit 911 may calculate a variation in execution time of the second operation based on the execution time of the second operation according to the first scheduling and the execution time of the second operation according to the second scheduling. Subsequently, the execution time estimation unit 913 may add the variation in execution time of the second operation to the execution time of the second operation according to the second scheduling to estimate an execution time of a second operation in the third scheduling.

In accordance with the first implementation, the execution time measurement unit 950 may measure an execution time of a third operation according to the first scheduling. Subsequently, during execution of the second scheduling, the execution time estimation unit 913 may estimate an execution time of a third operation in the second frame based on the measured execution time of the third operation according to the first scheduling. In addition, the execution time measurement unit 950 may measure an execution time of a third operation according to the second scheduling. Subsequently, during execution of the third scheduling, the execution time estimation unit 913 may estimate an execution time of a third operation in the third frame based on the measured execution time of the third operation according to the second scheduling.

In accordance with the second implementation, the execution time measurement unit 950 may measure an execution time of a third operation according to the first scheduling. In addition, the execution time measurement unit 950 may measure an execution time of a third operation according to the second scheduling. Subsequently, the variation calculation unit 911 may calculate a variation in execution time of the third operation based on the execution time of the third operation according to the first scheduling and the execution time of the third operation according to the second scheduling. Subsequently, the execution time estimation unit 913 may add the variation in execution time of the third operation to the execution time of the third operation according to the second scheduling to estimate an execution time of a third operation in the third scheduling.

The execution time estimation unit 913 may estimate the execution time of the first operation within a range equal to or greater than a reference time. The first operation may be a requisite one of the operations, e.g., an operation that is important or required for operation of the vehicle. In addition, the first operation may be one that yields less useful (e.g., less accurate) when not executed for at least a duration the reference time or more. For example, in a case in which pedestrian detection is performed during a time less than a threshold (e.g., 25 msec), such detection may not yield sufficiently accurate results. In this case, the execution time estimation unit 913 may estimate the pedestrian detection over a duration that is equal to or greater than 25 msec.

The execution sequence setting unit 915 may set an execution sequence (e.g., a priority) of the operations. For example, the execution sequence setting unit 915 may set which of the first to third operations will be executed with higher priority and which of the first to third operations will be executed with lower priority according to a predetermined criterion.

The execution sequence may be set based on the execution times of the operations estimated by the execution time estimation unit 913. For example, in a case in which the estimated execution times of the first, second, and third operations are sequentially longer, the execution sequence setting unit 915 may set the execution sequence in order of the first, second, and third operations. In this case, an operation having a shorter estimated execution time is executed first, whereby it is possible to reduce average delay and execute more operations within a limited time.

The execution sequence may be set by reflecting a travel environment or external environment of the vehicle. In some implementations, the processor 170 may further include a travel environment and external environment determination unit (not shown). The travel environment and external environment determination unit (not shown) may determine the travel environment or the external environment based on stereo images received from the stereo camera 195. Alternatively, the travel environment and external environment determination unit (not shown) may determine the travel environment or the external environment based on the sensor information received through the interface unit 130. The travel environment may be any one selected from among various roads, such as an expressway, a national road, a country road, and a downtown road, on which the vehicle is traveling. In some implementations, the external environment may be any one selected from among a state of a section in which the vehicle is traveling, a state of weather during traveling of the vehicle, and a traveling time of the vehicle.

The execution sequence may, in some scenarios, be set by default. For example, before execution times of a plurality of operations are measured, the execution sequence setting unit 915 may set the execution sequence by default. In some implementations, in a case in which it is not possible to measure execution times of a plurality of operations in the previous frame, the execution sequence setting unit 915 may set the execution sequence by default. For example, in a case in which the execution sequence is set for the first time or the execution sequence is set after the occurrence of an error, the execution sequence setting unit 915 may set the execution sequence by default. Alternatively, the execution sequence setting unit 915 may set the execution sequence by default under a predetermined environment. For example, in a case in which the external environment of the vehicle is any one selected from among a tunnel entrance or exit, a sunrise or sunset time, and a rainy or snowy weather, the execution sequence setting unit 915 may set the execution sequence by default.

In a case in which there is a requisite operations among the operations, such as an operation that is important or required for operation of the vehicle, then the execution sequence setting unit 915 may set the requisite operation as one of highest priority. For example, in a case in which the first operation is an operation related to safe running of the vehicle, the execution sequence setting unit 915 may set the first operation as one of highest priority. In another example, the execution sequence setting unit 915 may set the pedestrian detection, which is related to safety of pedestrians, as one of highest priority. The first memory 140 may prestore a list of requisite operations. The execution sequence setting unit 915 may preset priority of the execution sequence based on the list stored in the first memory 140 and then set a subsequent execution sequence.

In some implementations, in a case in which there is a requisite operation among the operations in the second frame, the execution sequence setting unit 915 may set the requisite operation as one of highest priority. For example, in a case in which the first operation in the second frame is an operation related to safe running of the vehicle, the execution sequence setting unit 915 may set the first operation as one of highest priority. Subsequently, in a case in which the processor 170 receives the third frame from the stereo camera 195 and executes the third scheduling for the first to third operations, the execution sequence setting unit 915 may set the first operation as one of highest priority.

The determination unit 917 may sum the estimated execution times of the operations and determine whether the sum of the estimated execution times of the operations is equal to or greater than a critical value. For example, the determination unit 917 may sum up the estimated execution times of the first to third operations and determine whether the sum of the estimated execution times of the first to third operations is equal to or greater than the critical value.

The critical value may mean a threshold value that can be processed by the processor 170. For example, for a plurality of continuously received frames, the operation of the current frame must be completed before the next frame is received. In this case, the critical value may be related to a possible operation execution time of the processor 170 in the current frame before the next frame is received. For example, in a case in which a plurality of operations is executed in a second frame after a plurality of operations is executed in a first frame, the processor 170 may be configured to execute the operations of the first frame before the second frame is received. In this case, the critical value may be a possible operation execution time of the processor 170 in the first frame before the second frame is received.

In a case in which the sum of the estimated execution times of the operations is less than the critical value, the operation execution unit 930 may execute a plurality of operations according to scheduling.

In a case in which the sum of the estimated execution times of the operations is equal to or greater than the critical value, the determination unit 917 may determine whether there is an operation that can be excluded from the operations. For example, the determination unit 917 may determine whether there is an operation that can be excluded from first to third operations.

Upon determining that there is an excludable operation, the determination unit 917 may exclude the operation determined to be excludable. For example, upon determining that the first operation is excludable, the determination unit 917 may exclude the first operation. As a specific example, in a case in which the vehicle is traveling on an expressway, pedestrian detection may be excluded. In a case in which the sum of the estimated execution times of the operations is equal to or greater than the critical value in this situation, the determination unit 917 may determine that the pedestrian detection is an excludable operation.

In some implementations, an excluded operation may be executed with higher priority during scheduling in the next frame. For example, if a first operation is excluded from a second frame and the processor 170 receives a third frame and executes a third scheduling for first to third operations in the third frame, then the execution sequence setting unit 915 may set the execution sequence such that the first operation has higher priority.

In some implementations, an excluded operation may be executed with higher priority during scheduling in the next frame in consideration of the measured execution times of the other operations. For example, if a first operation is excluded from a second frame and the processor 170 receives a third frame and executes a third scheduling for first to third operations in the third frame, then the execution sequence setting unit 915 may set the execution sequence in consideration of the execution times of the second and third operations. Specifically, in a case in which the execution time of one of the second and third operations is equal to or greater than a predetermined reference value, the execution sequence setting unit 915 may set the execution sequence such that the operation having the execution time equal to or greater than the reference value has higher priority than the first operation.

After an operation is determined to be excludable, the determination unit 917 may sum the estimated execution times of the operations. The execution sequence setting unit 915 may set the execution sequence of the operations. The determination unit 917 may determine whether the sum of the estimated execution times of the operations is equal to or greater than the critical value.

In a case in which there is no excludable operation, the execution time estimation unit 913 may adjust the estimated execution times of the operations. For example, the execution time estimation unit 913 may adjust the estimated execution time of at least one of the first to third operations. In a case in which the estimated execution time of the first operation is excessively longer than those of the second and third operations, the execution time estimation unit 913 may reduce the estimated execution time of the first operation. In a case in which the estimated execution times of the first to third operations are almost equal, the execution time estimation unit 913 may reduce the estimated execution times of the first to third operations.

After adjustment of the estimated execution times of the operations, the determination unit 917 may sum up the estimated execution times of the operations. The execution sequence setting unit 915 may set the execution sequence of the operations. The determination unit 917 may determine whether the sum of the estimated execution times of the operations is equal to or greater than the critical value.

The operation execution unit 930 may, in some implementations, include the disparity calculator 420, the segmentation unit 432, the object detector 434, the object verification unit 436, the object tracking unit 440, and the application unit 450. Descriptions are provided herein regarding object detection, which is one of a plurality of operations. However, implementations are not limited thereto. For example, a plurality of operations may include more or all operations that can be executed by the processor 170.

The operation execution unit 930 may execute a plurality of operations according to the scheduling. For example, the operation execution unit 930 may execute a first operation 931, a second operation 932, and a third operation 933 according to the first scheduling in the first frame. In addition, the operation execution unit 930 may execute a first operation 931, a second operation 932, and a third operation 933 according to the second scheduling in the second frame. Furthermore, the operation execution unit 930 may execute a first operation 931, a second operation 932, and a third operation 933 according to the third scheduling in the third frame. In this figure, only the first operation 931, the second operation 932, and the third operation 933 are illustrated, but implementations are not limited thereto, and other operations may further be executed.

As an example, the operation execution unit 930 may execute operations that include lane detection (LD), adjacent vehicle detection (VD), pedestrian detection (PD), bright spot detection (BD), traffic sign recognition (TSR), road surface detection, bicycle detection (BD), motor cycle detection (MCD), and/or high beam assistance.

The execution time measurement unit 950 may measure execution times of the operations.

For example, the execution time measurement unit 950 may measure an execution time of the first operation according to the first scheduling in the first frame. In addition, the execution time measurement unit 950 may measure an execution time of the first operation according to the second scheduling in the second frame. Furthermore, the execution time measurement unit 950 may measure an execution time of the first operation according to the third scheduling in the third frame.

In another example, the execution time measurement unit 950 may measure an execution time of the second operation according to the first scheduling in the first frame. In addition, the execution time measurement unit 950 may measure an execution time of the second operation according to the second scheduling in the second frame. Furthermore, the execution time measurement unit 950 may measure an execution time of the second operation according to the third scheduling in the third frame.

In a further example, the execution time measurement unit 950 may measure an execution time of the third operation according to the first scheduling in the first frame. In addition, the execution time measurement unit 950 may measure an execution time of the third operation according to the second scheduling in the second frame. Furthermore, the execution time measurement unit 950 may measure an execution time of the third operation according to the third scheduling in the third frame.

In some implementations, the measured execution times of the operations may be stored in the DB 141. The DB 141 may, for example, include a predetermined database provided in the first memory 140.

Figure 10:
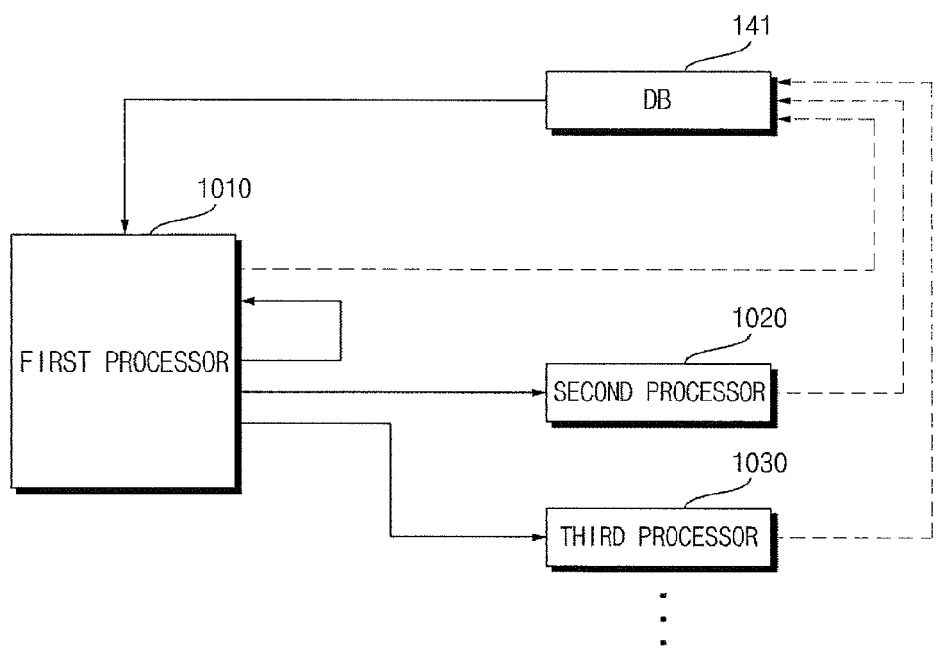
FIG. 10 is a diagram illustrating an example in which a driver assistance apparatus is equipped with a plurality of processors.

FIG. 10 is a view showing an example of a driver assistance apparatus that is equipped with a plurality of processors.

Referring to FIG. 10, a plurality of processors 170 may be provided. For example, a first processor 1010, a second processor 1020, and a third processor 1030 may be provided. In the figure, only the first processor 1010, the second processor 1020, and the third processor 1030 are illustrated. However, implementations are not limited thereto, and greater or fewer processors may be provided.

In a case in which the processors 1010, 1020, and 1030 are provided, each operation in a plurality of operations may be individually executed by the processors 1010, 1020, and 1030.

For example, the first processor 1010 may be a main processor. The first processor 1010 may include an image preprocessor 410, a scheduling unit 910, a first operation execution unit 930*a*, an operation distribution unit (not shown), and a first execution time measurement unit 950*a*. The second processor 1020 and the third processor 1030 may be sub processors. The second processor 1020 may include a second operation execution unit 930*b* and a second execution time measurement unit 950*b*. The third processor 1030 may include a third operation execution unit 930*c* and a third execution time measurement unit 950*c*. The operations of some of the units were previously described with reference to FIG. 9.

The operation distribution unit (not shown) may distribute operations which will be executed by the first processor 1010 and the second processor 1020 based on estimated operation times of the operations.

Hereinafter, a description will be given based on operations of the first processor 1010 and the second processor 1020.

The first processor 1010 may estimate execution times of a plurality of operations based on measured execution times of the operations. The first processor 1010 may distribute operations to be executed by the first processor 1010 and the second processor 1020 based on the estimated execution times of the operations. The first processor 1010 may set an execution sequence of the operations to be executed by the first processor 1010 and the second processor 1020.

For example, the first processor 1010 may estimate execution times of first to third operations based on measured execution times of the operations. The first processor 1010 may distribute the first to third operations to the first processor 1010 and the second processor 1020 such that the first and second operations can be executed by the first processor 1010 and the third operation can be executed by the second processor 1020 based on the estimated execution times of the operations. The first processor 1010 may set an execution sequence of the first and second operations distributed to the first processor 1010 and the third operation distributed to the second processor 1020.

In a case in which the first and second operations are distributed to the first processor 1010 and the third operation is distributed to the second processor 1020, the first processor 1010 may estimate and sum up the execution times of the first and second operations. The first processor 1010 may determine whether the sum of the estimated execution times of the operations is equal to or greater than a critical value. The critical value may mean a threshold value that can be processed by the first processor 1010. For example, for a plurality of continuously received frames, the operation of the current frame must be completed before the next frame is received. As a specific example, the critical value may be a possible operation execution time of the first processor 1010 in the current frame before the next frame is received.

In a case in which the sum of the estimated execution times of the operations is equal to or greater than the critical value, the first processor 1010 may redistribute any one of the first and second operations to the second processor 1020. In this case, the second processor 1020 may further execute the redistributed operation. For example, the second processor 1020 may further execute any one of the first and second operations.

The image preprocessor 410 of the first processor 1010 may perform 2D and 3D based preprocessing. At this time, the first processor 1010 may distribute the first and second operations, which are executed based on the 2D based preprocessing, to the first processor 1010 and distribute the third operation, which is executed based on the 3D based preprocessing, to the second processor 1020. In this case, the first processor 1010 may estimate and sum the execution times of the first and second operations, and determine whether the sum of the estimated execution times of the operations is equal to or greater than a critical value. The critical value may be a threshold value that can be processed by the first processor 1010. For example, for a plurality of continuously received frames, the operation of the current frame must be completed before the next frame is received. In this case, the critical value may be a possible operation execution time of the first processor 1010 in the current frame before the next frame is received.

In a case in which the sum of the estimated execution times of the operations is equal to or greater than the critical value, the first processor 1010 may redistribute any one of the first and second operations to the second processor 1020. In this case, the second processor 1020 may further execute the redistributed operation. For example, the second processor 1020 may further execute the redistributed operation based on the 3D based preprocessing. For example, the second processor 1020 may further execute any one of the first and second operations based on the 3D based preprocessing.

As described in the above examples, the operations to be executed by the first processor 1010 and the second processor 1020 may be flexibly distributed, so as to enable efficient use the processors 170. In addition, such techniques may enable the processors 170 to stably execute the operations.

In some implementations, the first processor 1010 may distribute the operations to the first processor 1010 and the second processor 1020 such that the operations executed by the first processor 1010 and the operation executed by the second processor 1020 may be balanced based on the estimated execution times of the operations. As an example, the first processor 1010 may distribute the operations to the first processor 1010 and the second processor 1020 such that a difference between the execution times of the operations executed by the first processor 1010 and the execution time of the operation executed by the second processor 1020 are reduced. As a specific example, if the estimated execution time of the first operation is 30 msec, the estimated execution time of the second operation is 10 msec, and the estimated execution time of the third operation is 5 msec, then the first processor 1010 may distribute the first operation to the first processor 1010 and distribute the second and third operations to the second processor 1020 such that loads applied to the first processor 1010 and the second processor 1020 may be balanced.

Figure 11A:
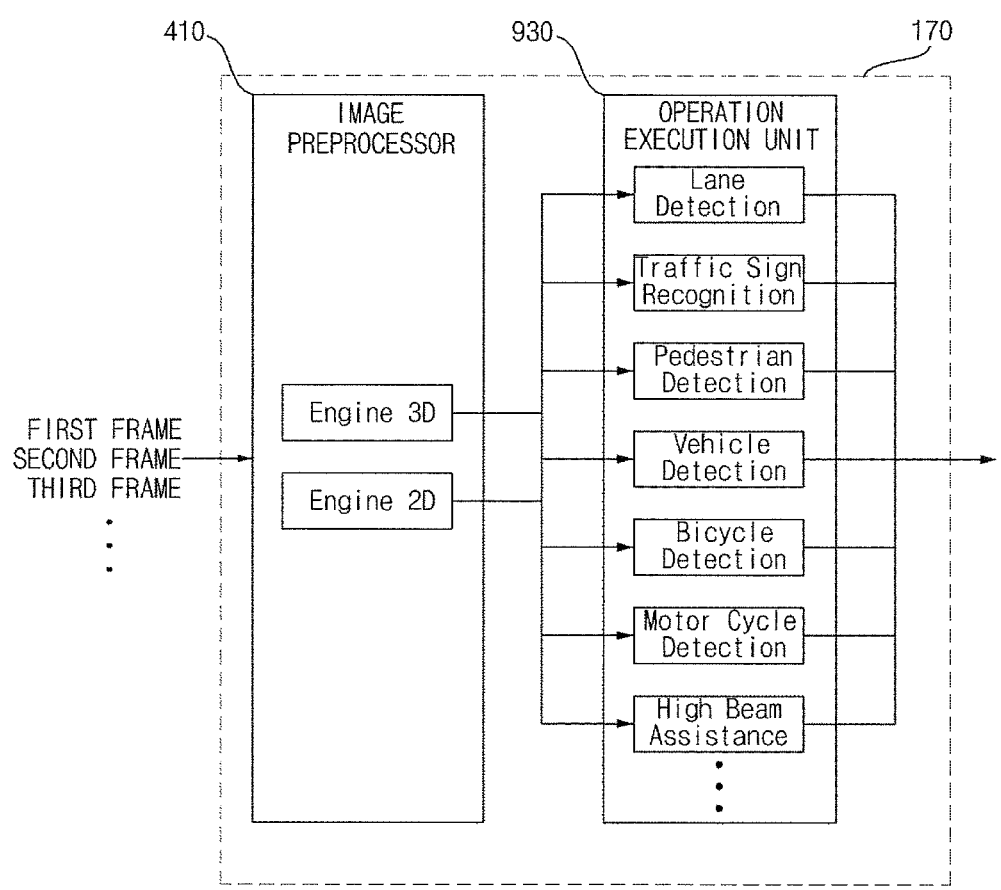
FIGS. 11A and 11B are internal block diagrams illustrating examples of processors and processing flow that may be used during an operation of a driver assistance apparatus.
Figure 11B:
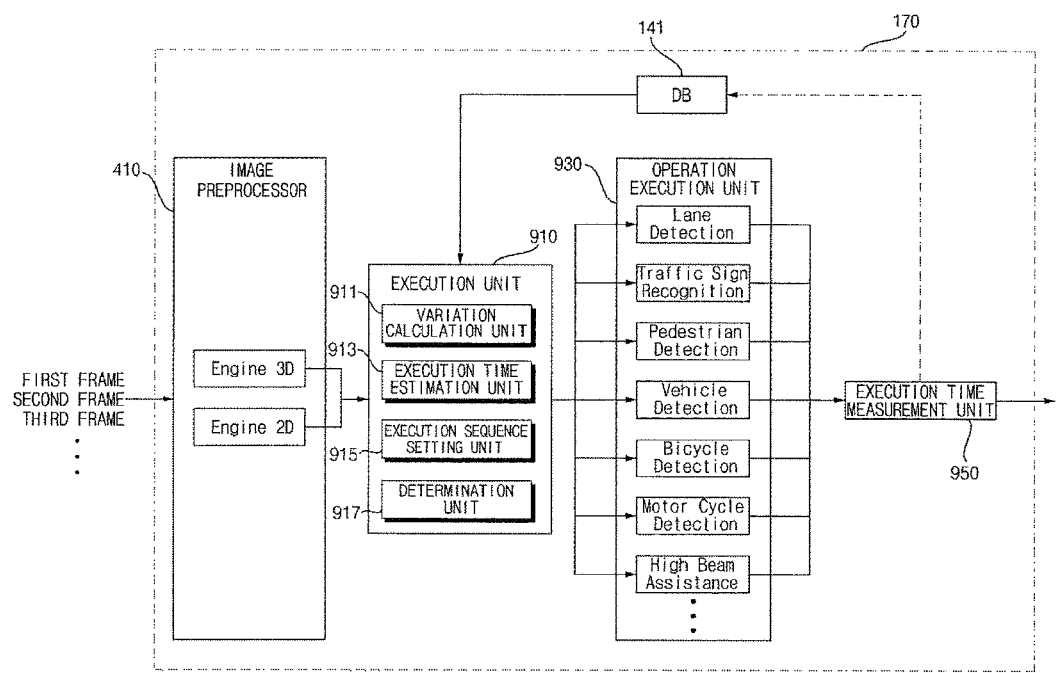

FIGS. 11A and 11B are internal block diagrams of examples of processors provided to illustrate the operation of the driver assistance apparatus.

FIG. 11A is an internal block diagram of a processor 170 which does not include a scheduling unit 910 and an execution time measurement unit 950.

Referring to the example in FIG. 11A, the processor 170 may include an image preprocessor 410 and an operation execution unit 930.

The image preprocessor 410 may receive stereo images from the stereo camera 195 and perform preprocessing for the received stereo images. For example, the image preprocessor 410 may perform 3D based (Engine 3D) preprocessing and/or 2D based (Engine 2D) preprocessing.

In some implementations, the operation execution unit 930 may execute a plurality of operations according to a predetermined execution sequence and processing times. For example, the operation execution unit 930 may execute operations such as lane detection (LD), adjacent vehicle detection (VD), pedestrian detection (PD), bright spot detection (BD), traffic sign recognition (TSR), road surface detection, bicycle detection (BD), motor cycle detection (MCD), and/or high beam assistance according to the predetermined execution sequence and processing times. In this case, the processing times and the execution sequence of the operations may be fixed, and may be suitable for situations that are static in nature. However, if the execution times of operations is variable, for example, due to a changing environment around the moving vehicle, then the fixed scheduling may be unable to perform an operation if the actual execution time of the operation exceeds the fixed assignment of execution time.

FIG. 11B is an internal block diagram of an example of a processor (e.g., processor 170) which includes a scheduling unit 910 and an execution time measurement unit 950. The scheduling unit 910 and execution time measurement unit 950 may enable the processor 170 to adaptively adjust the scheduling so as to accommodate variable execution times of operations between different frames.

Referring to the example in FIG. 11B, the processor 170 may include an image preprocessor 410, a scheduling unit 910, an operation execution unit 930, and execution time measurement unit 950.

The image preprocessor 410 may receive stereo images from the stereo camera 195 and perform preprocessing for the received stereo images. For example, the image preprocessor 410 may perform 3D based (Engine 3D) preprocessing and/or 2D based (Engine 2D) preprocessing.

The scheduling unit 910 may execute scheduling for a plurality of operations. Scheduling may be an operation to estimate execution times of the operations and to set an execution sequence of the operations. In some implementations, the scheduling unit 910 may execute scheduling based on measured execution times of the operations. The measured execution times may be execution times measured by the execution time measurement unit 950. Alternatively or additionally, the measured execution times may be execution times stored in computer memory, such as the DB 141.

The operation execution unit 930 may execute a plurality of operations according to scheduling. For example, the operation execution unit 930 may execute operations such as lane detection (LD), adjacent vehicle detection (VD), pedestrian detection (PD), bright spot detection (BD), traffic sign recognition (TSR), road surface detection, bicycle detection (BD), motor cycle detection (MCD), and/or high beam assistance according to scheduling executed by the scheduling unit 910.

The execution time measurement unit 950 may measure execution times of a plurality of operations. The measured execution times of the operations may be stored in the DB 141. In addition or as an alternative, the measured execution times of the operations may be transmitted to the scheduling unit 910.

Techniques in the examples described above may enable the driver assistance apparatus 100 to stably and efficiently execute a plurality of operations by executing the operations according to scheduling. In addition, the performance of the driver assistance apparatus 100 may be improved, whereby it may be possible to offer better convenience to a user who uses the vehicle.

Figure 12A:
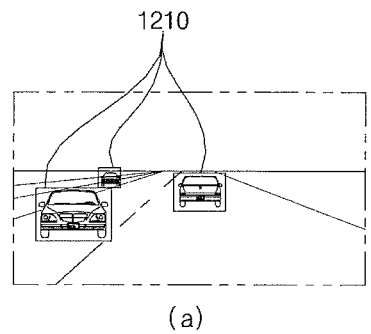
FIGS. 12(a) and 12(b) are diagrams illustrating examples of a comparison between a first operation execution time and a second operation execution time for two different operations under similar driving conditions.
Figure 12B:
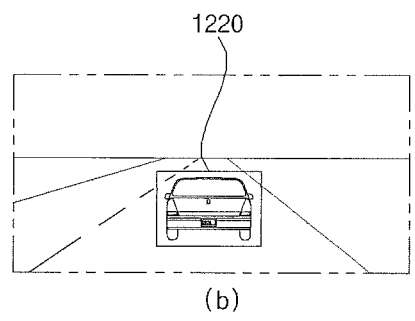

FIGS. 12(*a*) and 12(*b*) are diagrams illustrating examples of a comparison between a first operation execution time and a second operation execution time for two different operations. In these examples, the two operations correspond to an adjacent vehicle detection operation and a lane detection operation.

In this example, the operation execution time of adjacent vehicle detection may depend on, for example, the number of adjacent vehicles being detected, with more adjacent vehicles requiring a longer detection time. The operation execution time of lane detection may depend on, for example, visible characteristics of lane markers, a speed of movement of the vehicle, etc.

FIGS. 12(*a*) and 12(*b*) illustrate examples of images acquired by the stereo camera 195 during traveling of the vehicle on different sections of an expressway.

Referring to FIG. 12(*a*), the processor 170 may detect three adjacent vehicles 1210 from the images received from the stereo camera 195. The processor 170 may execute an operation of adjacent vehicle detection for the three vehicles 1210 and, as an example, may measure an execution time of the adjacent vehicle detection operation as 12.334 msec. In addition, the processor 170 may execute lane detection and, for example, may measure an execution time of the lane detection operation as 17.874 msec.

Referring to the example in FIG. 12(*b*), the processor 170 may detect one adjacent vehicle 1220 from the images received from the stereo camera 195. The processor 170 may execute adjacent vehicle detection for the one vehicle 1220 and, as an example, may measure an execution time of the adjacent vehicle detection operation as 7.634 msec. In addition, the processor 170 may execute lane detection and, as an example, may measure an execution time of the lane detection operation as 23.747 msec.

The processor 170 may also determine a critical value for processing a frame. As described above, this critical value may correspond to a total available time during which the processor may execute operations for a single frame before the next frame is received and to be processed. As an example, the processor 170 may determine that the critical value for processing a frame is 33 msec.

If operations are executed without scheduling (as shown in FIG. 11A), then the processor may determine a fixed assignment of execution times to the two operations of adjacent vehicle detection and lane detection. For example, the fixed assignment may divide the critical value of 33 msec into a fixed execution time of 11 msec for adjacent vehicle detection, and a fixed execution time of 22 msec for lane detection.

In this fixed assignment scenario, the lane detection operation in FIG. 12(*a*), having a measured execution time of 17.874 msec, may be executed within the assigned time of 22 msec. On the other hand, the adjacent vehicle detection operation, having a measured execution time of 12.334 msec, may not be executed within the assigned time of 11 msec.

As another example of this fixed assignment scenario, in FIG. 12(*b*), the adjacent vehicle detection may be executed within the assigned time, whereas the lane detection may not be executed due to the execution time of the lane detection being greater than the assigned time.

As described in the examples above, under a fixed assignment scenario, even if the processor 170 has the ability to execute multiple operations within a critical value of a frame, one or more of the operations may not be successfully executed due to varying execution times that may exceed the fixed assigned times. As in the examples above, it may not be possible to execute both the adjacent vehicle detection and the lane detection due to assignment of times to the operations in a batch fashion, even though the processor 170 has the ability to execute both operations.

In a case in which the operations are executed after adaptive scheduling is determined (as shown in FIG. 11B), the processor 170 may be able to predict an estimated execution time for each operation based on previous frames, and adjust the scheduling to accommodate the changing execution times. For example, in the example of FIG. 12(*b*), based on the measured execution time of the adjacent vehicle detection operation as 12.334 msec and the measured execution time of the lane detection operation of 17.874 msec, the processor 170 may adjust the scheduling in the next frame accordingly.

Consequently, in the subsequent frame, the processor 170 may determine a scheduling that assigns an execution time of 12.334 msec to the adjacent vehicle detection operation, and that assigns an execution time of 17.874 msec to the lane detection operation, based on the previously measured execution times in FIG. 12(*b*). If the execution times of those two operations in the subsequent frame is not significantly different from the estimated execution times assigned in the scheduling, then both operations may be successfully completed. Furthermore, in this example, the total execution time of the two operations is 30.198 msec, which is less than the critical value of 33 msec for the frame, and thus it is possible to execute both the adjacent vehicle detection and the lane detection.

As another example, in FIG. 12(*b*), processor 170 may determine a scheduling for a subsequent frame based on the measured execution times in the frame of FIG. 12(*b*). For example, the scheduling may assign an estimated execution time of 7.634 msec to the adjacent vehicle detection operation and assign an estimated execution time of 23.747 msec to the lane detection operation based on the measured execution times of FIG. 12(*b*). Consequently, in the subsequent frame, the operations may be successfully executed over a total duration of 31.381 msec, which is the sum of 7.634 msec and the 23.747 msec, within the critical value of 33 msec. As such, it is possible to execute both the adjacent vehicle detection operation and the lane detection operation within the subsequent frame.

FIGS. 13A to 17 are reference views illustrating examples of comparison between a first operation execution time and a second operation execution time under different driving conditions.

In some implementations, the scheduling may take into account the surrounding conditions of the vehicle. Different environments may have different types of objects. For example, roads that are exclusively used for vehicles (e.g., highways) may typically have more vehicles than pedestrians in the surrounding environment of the vehicle. In such scenarios, an adjacent vehicle detection operation may typically require a longer execution time than pedestrian detection. As another example, local roads (e.g., in an urban environment) may typically have more pedestrians than vehicles in the surrounding environment of the vehicle. In such scenarios, the execution time of pedestrian detection may typically be greater than adjacent vehicle detection.

As such, in some implementations, the processor 170 may determine a scheduling, and in particular may assign execution times to different operations, based on the driving condition of the vehicle. For example, a scheduling may assign a longer execution to adjacent vehicle detection than pedestrian detection if the processor 170 determines that the vehicle is travelling on an exclusive road for vehicles. As another example, a scheduling may assign a longer execution to pedestrian detection than adjacent vehicle detection if the processor 170 determines that the vehicle is travelling on a local road.

Figure 13A:
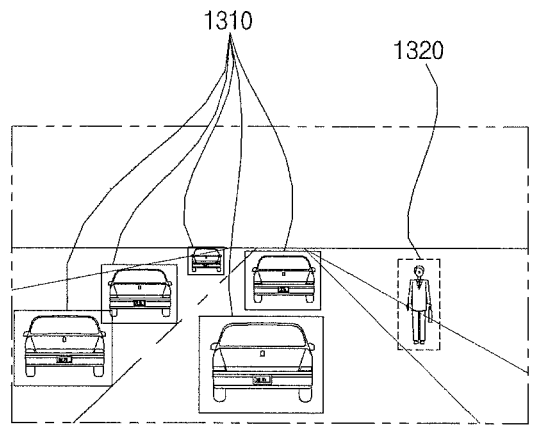
FIGS. 13A, 13B(a), 13B(b), 14A, 14B(a), 14B(b), 15A, 15B, 16A, 16B, 17(a), and 17(b) are diagrams illustrating examples of comparison between a first operation execution time and a second operation execution time under different conditions.
Figure 13B:
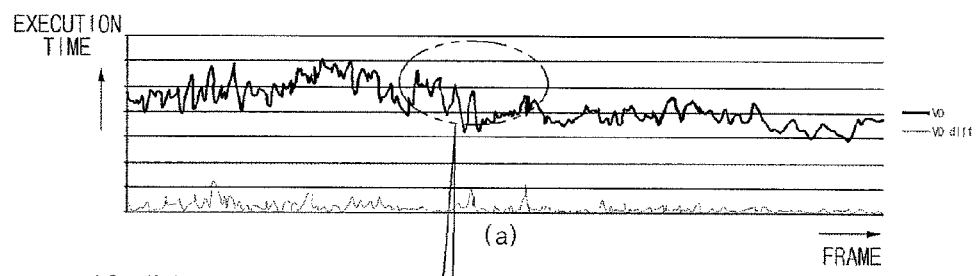
Figure 13B:
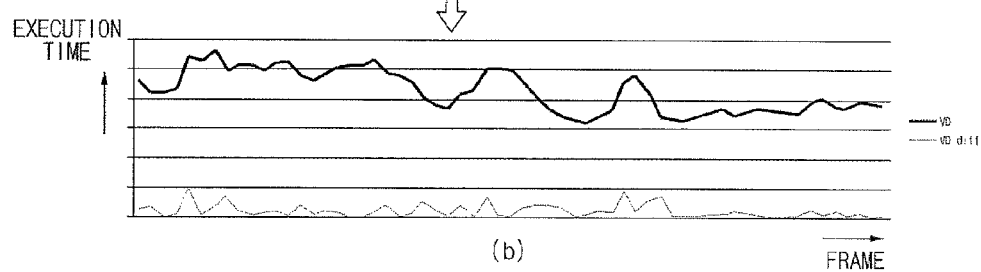

FIGS. 13A and 13B are reference views illustrating adjacent vehicle detection based on images acquired by the stereo camera 195 during traveling of the vehicle on an exclusive road for vehicles.

Referring first to FIG. 13A, the processor 170 may detect five adjacent vehicles 1310 from the images received from the stereo camera 195. In addition, the processor 170 may detect one pedestrian 1320.

As shown in FIG. 13B, a measured execution time (VD) and a variation of the execution time (VD diff) over frames (X axis) may be shown as graphs.

FIG. 13B(a) shows a measured execution time (VD) and a variation of the execution time (VD diff) over 500 frames, and FIG. 13B(b) is an enlarged view of a portion of FIG. 13B(a) showing a measured execution time (VD) and a variation of the execution time (VD diff) over 50 frames.

In FIG. 13B(a), it may appear as if the measured execution time of the adjacent vehicle detection (VD) is abruptly changed in the circled portion. However, as shown in FIG. 13B(b), which is an enlarged view of the circled portion of FIG. 13B(a), it can be seen that the change of the measured execution time of the adjacent vehicle detection (VD) is relatively small over a smaller window of time.

The variation of the execution time of the adjacent vehicle detection (VD diff) indicates a difference of measured execution time between the previous frame and the next frame. It can be seen from FIG. 13B(b) that the variation of the execution time of the adjacent vehicle detection (VD diff) remains relatively equal without great difference over the smaller window of time.

If a change of vehicle detection execution time between frames is relatively small, then it may be possible to estimate the execution time of adjacent vehicle detection in the next frame based on the execution time of adjacent vehicle detection measured in the previous frame. In addition, it may be possible to estimate the execution time of adjacent vehicle detection in the next frame based on the variation of execution time of adjacent vehicle detection calculated in the previous frame.

Figure 14A:
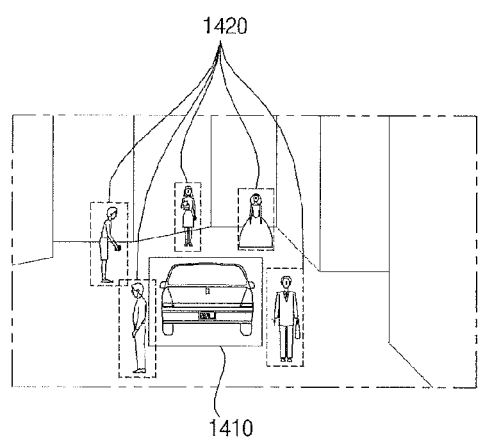
Figure 14B:
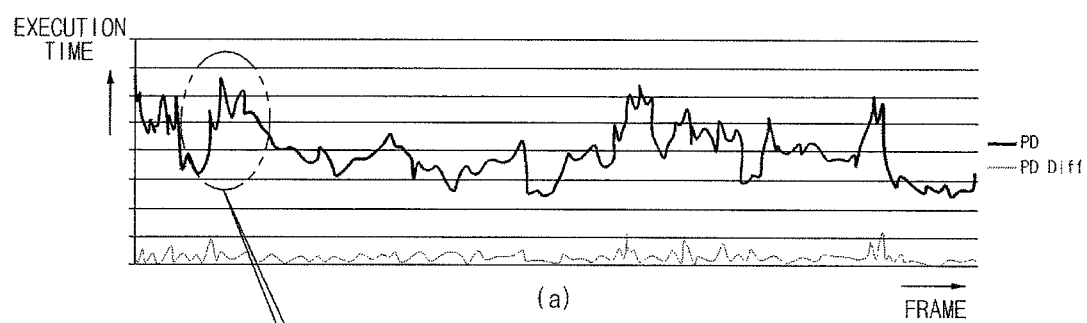
Figure 14B:
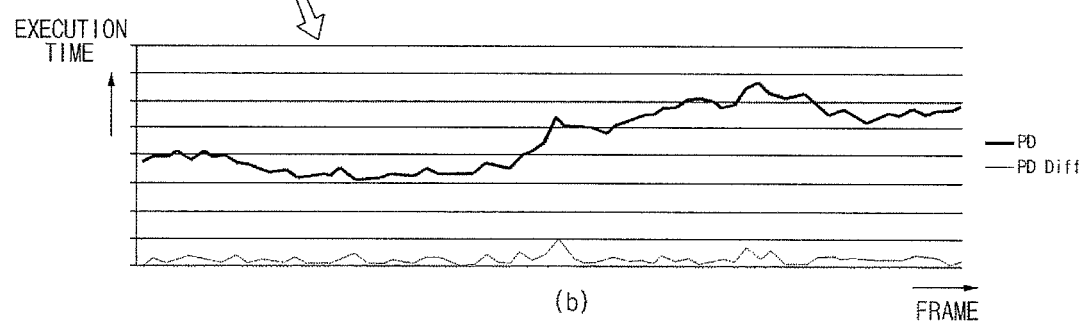

FIGS. 14A and 14B are reference views illustrating pedestrian detection based on images acquired by the stereo camera 195 during traveling of the vehicle on a local road.

Referring to FIG. 14A, the processor 170 may detect one adjacent vehicle 1410 from the images received from the stereo camera 195. In addition, the processor 170 may detect five pedestrians 1420.

As shown in FIG. 14B, a measured execution time (PD) and a variation of the execution time (PD diff) over frames (X axis) may be shown as graphs.

FIG. 14B(a) shows a measured execution time (PD) and a variation of the execution time (PD diff) over 500 frames, and FIG. 14B(b) is an enlarged view of the circled portion of FIG. 14B(a) showing a measured execution time (PD) and a variation of the execution time (PD diff) over 50 frames.

In FIG. 14B(a), it may appear as if the measured execution time of the pedestrian detection (PD) is abruptly changed in the circled portion. However, as shown in FIG. 14B(b), which is an enlarged view of a portion of FIG. 14B(a), it can be seen that the change of the measured execution time of the pedestrian detection (PD) is relatively small over the smaller window of time.

The variation of the execution time of the pedestrian detection (PD diff) indicates a difference of measured execution time between the previous frame and the next frame. It can be seen from FIG. 14B(b) that the variation of the execution time of the pedestrian detection (PD diff) remains relatively equal without great difference.

If the change of pedestrian detection execution time between frames is relatively small, then it may be possible to estimate the execution time of pedestrian detection in the next frame based on the execution time of pedestrian detection measured in the previous frame. In addition, it may be possible to estimate the execution time of pedestrian detection in the next frame based on the variation of execution time of the pedestrian detection calculated in the previous frame.

Figure 15A:
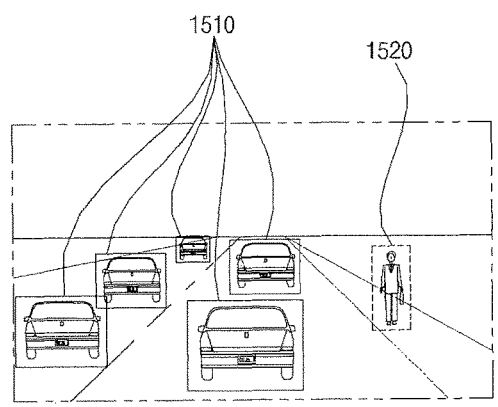
Figure 15B:
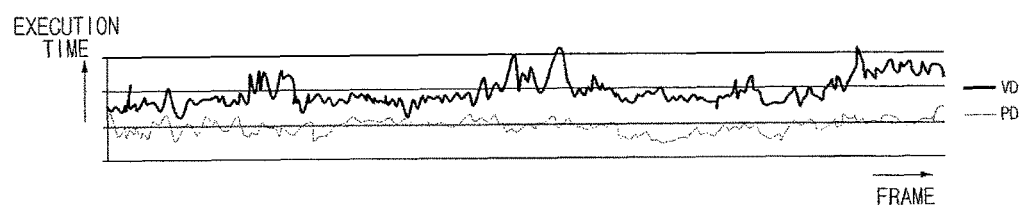

FIGS. 15A and 15B are reference views illustrating adjacent vehicle detection and pedestrian detection based on images acquired by the stereo camera 195 during traveling of the vehicle on an exclusive road for vehicles.

Referring to FIG. 15A, the processor 170 may detect five adjacent vehicles 1510 from the images received from the stereo camera 195. In addition, the processor 170 may detect one pedestrian 1520.

Referring to FIG. 15B, executing an operation of adjacent vehicle detection (VD) requires more time than executing an operation of pedestrian detection (PD) on the exclusive road for vehicles, on which a larger number of vehicles travel. In FIG. 15B, it can be seen that adjacent vehicle detection (VD) requires much more time than pedestrian detection (PD). This may be true even if executing an operation of pedestrian detection (PD) generally requires more time than adjacent vehicle detection (VD).

Figure 16A:
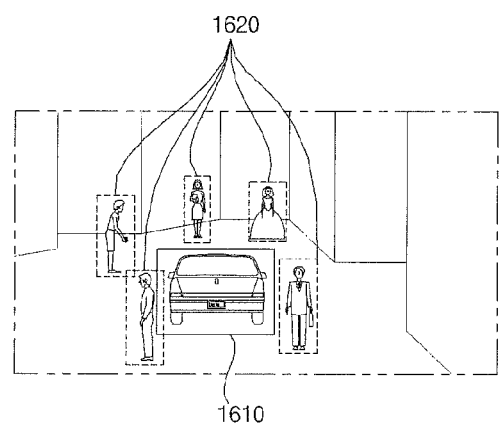
Figure 16B:
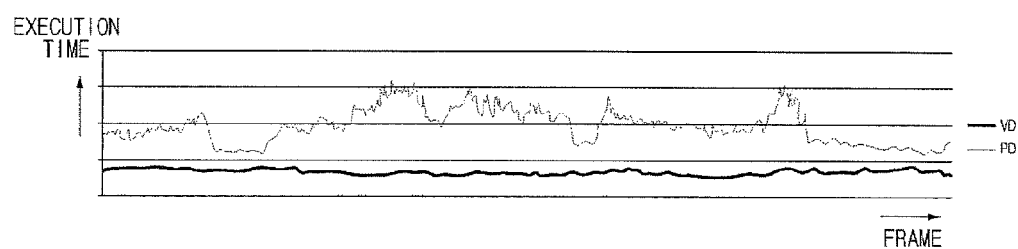

In addition, the adjacent vehicle detection (VD) during traveling of the vehicle on the exclusive road for vehicles requires more time than that during traveling of the vehicle on a local road (see FIG. 16B).

On the other hand, the pedestrian detection (PD) may require more time than the adjacent vehicle detection (VD) on the local road, on which a smaller number of pedestrians walk. In addition, the pedestrian detection (PD) during traveling of the vehicle on the exclusive road for vehicles requires less time than that during traveling of the vehicle on the local road (see FIG. 16B).

As a result, the adjacent vehicle detection (VD) may require more time than the pedestrian detection (PD) on the exclusive road for vehicles. In such scenarios, if the adjacent vehicle detection (VD) is executed with higher priority in the scheduling than the pedestrian detection (PD) on the exclusive road for vehicles, then it may be possible to more efficiently operate the processor 170.

FIGS. 16A and 16B are reference views illustrating adjacent vehicle detection and pedestrian detection based on images acquired by the stereo camera 195 during traveling of the vehicle on a local road.

Referring to FIG. 16A, the processor 170 may detect one adjacent vehicle 1610 from the images received from the stereo camera 195. In addition, the processor 170 may detect five pedestrians 1620.

Referring to FIG. 16B, the pedestrian detection (PD) requires more time than the adjacent vehicle detection (VD) on the local road, on which a larger number of pedestrians walk. In addition, the pedestrian detection (PD) during traveling of the vehicle on the local road requires more time than that during traveling of the vehicle on the exclusive road for vehicles (see FIG. 15B).

On the other hand, the adjacent vehicle detection (VD) requires less time than the pedestrian detection (PD) on the local road, on which a smaller number of adjacent vehicles travel. In addition, the adjacent vehicle detection (VD) during traveling of the vehicle on the local road requires less time than that during traveling of the vehicle on the exclusive road for vehicles (see FIG. 15B).

As a result, the pedestrian detection (PD) may require more time than the adjacent vehicle detection (VD) on the local road. In such scenarios, if the pedestrian detection (PD) is executed with higher priority in the scheduling than the adjacent vehicle detection (VD) on the local road, then it may be possible to more efficiently operate the processor 170.

Figure 17A:
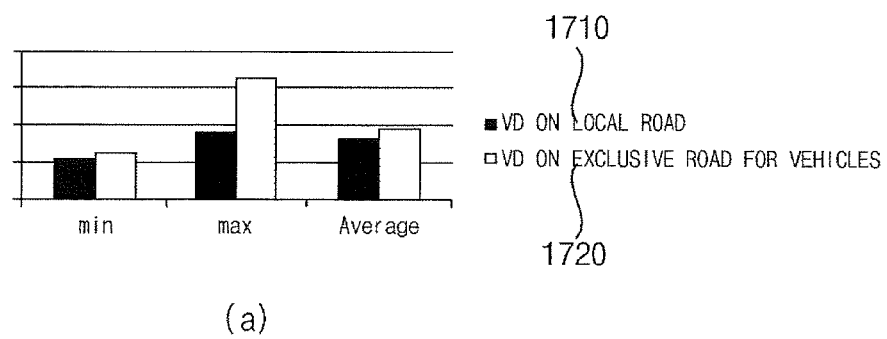

FIG. 17(a) is a graph showing execution times for adjacent vehicle detection (VD) on a local road (see, e.g., FIG. 16A) and on an exclusive road for vehicles (see, e.g., FIG. 15A).

In comparison among minimum values, maximum values, and mean values of execution times for adjacent vehicle detection (VD), it can be seen that the minimum value, the maximum value, and the mean value of execution time for adjacent vehicle detection (VD) 1720 on the exclusive road for vehicles are greater than those for adjacent vehicle detection (VD) 1710 on the local road. As a result, if the estimated execution time of the adjacent vehicle detection (VD) 1720 on the exclusive road for vehicles is greater than that of the adjacent vehicle detection (VD) 1710 on the local road, it may be possible to accurately and efficiently operate the processor 170.

Figure 17B:
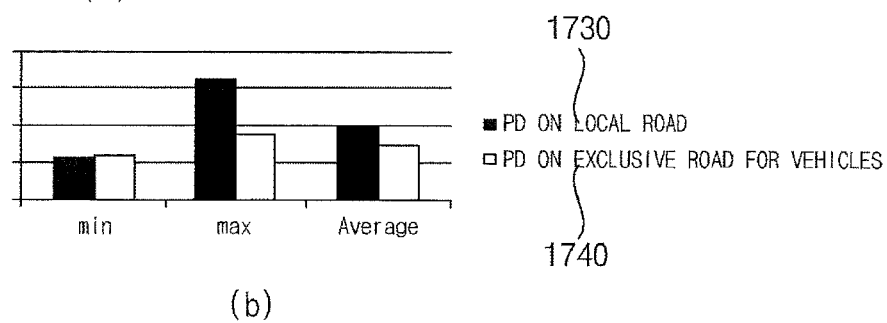

FIG. 17(b) is a graph showing execution times for pedestrian detection (PD) on a local road (see, e.g., FIG. 16A) and on an exclusive road for vehicles (see, e.g., FIG. 15A).

In comparison among minimum values, maximum values, and mean values of execution times for pedestrian detection (PD), it can be seen that the minimum value of time necessary for pedestrian detection (PD) 1730 on the local road is almost equal to that for pedestrian detection (PD) 1740 on the exclusive road for vehicles, but the maximum value and the mean value of time necessary for pedestrian detection (PD) 1730 on the local road are greater than those for pedestrian detection (PD) 1740 on the exclusive road for vehicles. As a result, if the estimated execution time of the pedestrian detection (PD) 1730 on the local road is greater than that of pedestrian detection (PD) 1740 on the exclusive road for vehicles, it may be possible to accurately and efficiently operate the processor 170.

The methods, techniques, systems, and apparatuses described herein may be implemented in digital electronic circuitry or computer hardware, for example, by executing instructions stored in tangible computer-readable storage media.

Apparatuses implementing these techniques may include appropriate input and output devices, a computer processor, and/or tangible computer-readable storage media storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and desired results still may be achieved. Similarly, components in the disclosed systems may be combined in a different manner and/or replaced or supplemented by other components and desired results still may be achieved.

What is claimed is:

1. A driver assistance apparatus configured to execute a first plurality of operations in a first frame of stereo images and execute a second plurality of operations in a second frame of the stereo images, the driver assistance apparatus comprising:

a stereo camera configured to acquire the stereo images;

at least one processor configured to:
receive the first frame from the stereo camera;
determine a first scheduling for the first plurality of operations in the first frame;
execute, in the first frame, the first plurality of operations according to the first scheduling;
measure execution times of the first plurality of operations that were executed according to the first scheduling;
receive the second frame from the stereo camera;
determine a second scheduling for the second plurality of operations in the second frame based on the measured execution times of the first plurality of operations that were executed in the first frame; and
create a control signal for attitude control or travel control of the vehicle, based on at least one operation among the first plurality of operations and the second plurality of operations; and an interface configured to transmit, to an electronic control unit or an audio video navigation apparatus, vehicle control information regarding the control signal for the attitude control or the travel control of the vehicle, wherein the stereo camera comprises a first camera having a first lens and a second camera having a second lens, and wherein the at least one processor is mounted on one surface of a circuit board.

2. The driver assistance apparatus according to claim 1, wherein the at least one processor is further configured to:

measure execution times of the second plurality of operations in the second frame that were executed according to the second scheduling;

receive a third frame from the stereo camera;

determine, based on the measured execution times of the second plurality of operations that were executed in the second frame, a third scheduling for a third plurality of operations to be executed in the third frame; and measure execution times of the third plurality of operations in the third frame that were executed according to the third scheduling.

3. The driver assistance apparatus according to claim 2, wherein the at least one processor is configured to:

receive a fourth frame from the stereo camera; and determine, based on the measured execution times of the third plurality of operations in the third frame, a fourth scheduling for a fourth plurality of operations to be executed in the fourth frame.

4. The driver assistance apparatus according to claim 1, wherein the at least one processor is configured to determine the second scheduling for the second plurality of operations in the second frame based on the measured execution times of the first plurality of operations that were executed in the first frame by:

estimating execution times of the second plurality of operations in the second frame based on the measured execution times of the first plurality of operations that were executed in the first frame; and determining an execution sequence for the second plurality of operations based on the estimated execution times.

5. The driver assistance apparatus according to claim 4, wherein the at least one processor is configured to determine the second scheduling for the second plurality of operations in the second frame based on the measured execution times of the first plurality of operations that were executed in the first frame further by:

determining a sum of the estimated execution times of the second plurality of operations;

determining whether the sum of the estimated execution times of the second plurality of operations is equal to or greater than a critical value; and based on a determination that the sum of the estimated execution times of the second plurality of operations is equal to or greater than the critical value, selecting an operation among the second plurality of operations to exclude from the second scheduling.

6. The driver assistance apparatus according to claim 4, wherein the at least one processor is configured to determine the second scheduling for the second plurality of operations in the second frame based on the measured execution times of the first plurality of operations that were executed in the first frame further by:

determining a sum of the estimated execution times of the second plurality of operations;

determining whether the sum of the estimated execution times of the second plurality of operations is equal to or greater than a critical value; and based on a determination that the sum of the estimated execution times of the second plurality of operations is equal to or greater than the critical value:

determining whether an operation among the second plurality of operations can be excluded from the second scheduling; and based on a determination that none of the second plurality of operations can be excluded from the second scheduling, adjusting the estimated execution time of at least one operation among the second plurality of operations.

7. The driver assistance apparatus according to claim 4, wherein determining an execution sequence for the second plurality of operations based on the estimated execution times comprises:

determining an ordering of execution for the second plurality of operations such that operations with smaller estimated execution times are executed with higher priority.

8. The driver assistance apparatus according to claim 4, wherein determining an execution sequence for the second plurality of operations based on the estimated execution times comprises:

determining a travel environment or external environment of a vehicle; and determining the execution sequence based on the travel environment or the external environment of the vehicle.

9. The driver assistance apparatus according to claim 4, wherein determining an execution sequence for the second plurality of operations based on the estimated execution times comprises:

accessing a predetermined ordering of operations.

10. The driver assistance apparatus according to claim 5, wherein the at least one processor is further configured to:

measure execution times of the second plurality of operations in the second frame that were executed according to the second scheduling;

receive, from the stereo camera, a third frame subsequent to the second frame; and determine, based on the measured execution times of the second plurality of operations that were executed in the second frame, a third scheduling for a third plurality of operations to be executed in the third frame, wherein the third scheduling is determined such that the excluded operation that was excluded from the second scheduling is to be executed with higher priority in the third scheduling.

11. The driver assistance apparatus according to claim 10, wherein the at least one processor is configured to determine, based on the measured execution times of the second plurality of operations that were executed in the second frame, the third scheduling for the third plurality of operations to be executed in the third frame further by:

determining whether the measured execution time of any one of the third plurality of operations, other than the excluded operation that was excluded from the second scheduling, is equal to or greater than a reference value; and determining an execution sequence of the third scheduling such that the operation having the measured execution time equal to or greater than the reference value is to be executed with higher priority than the excluded operation that was excluded from the second scheduling.

12. The driver assistance apparatus according to claim 4, wherein the at least one processor is configured to determine the second scheduling for the second plurality of operations in the second frame based on the measured execution times of the first plurality of operations that were executed in the first frame further by:

determining that an operation among the second plurality of operations is related to safe operation of a vehicle; and determining the second scheduling such that the operation related to safe operation of the vehicle is to be executed with a highest priority in the second scheduling, wherein the safe operation is a pedestrian detection operation.

13. The driver assistance apparatus according to claim 12, wherein the at least one processor is further configured to:
receive a third frame from the stereo camera; and
determine, based on the measured execution times of the second plurality of operations that were executed in the second frame, a third scheduling for a third plurality of operations to be executed in the third frame,
wherein the third scheduling is determined such that the operation related to safe operation of the vehicle that was determined in the second scheduling is to be executed with highest priority in the third scheduling.

14. The driver assistance apparatus according to claim 4, wherein the at least one processor is configured to determine the second scheduling for the second plurality of operations in the second frame based on the measured execution times of the first plurality of operations that were executed in the first frame further by:
determining whether at least one operation among the second plurality of operations is a requisite operation for the vehicle or an operation that yields unsatisfactory results if the execution time of the operation is less than a reference value; and
determining the second scheduling such that the estimated execution time of the at least one operation is equal to or greater than the reference value.

15. The driver assistance apparatus according to claim 4, wherein:
the at least one processor comprises a first processor and a second processor, and
the first processor is configured to, during the determination of the second scheduling for the second plurality of operations in the second frame based on the measured execution times of the first plurality of operations that were executed in the first frame:
determine, based on the estimated execution times of the second plurality of operations, a distribution of the second plurality of operations comprising a first group of operations to be executed by the first processor and a second group of operations to be executed by the second processor; and
determine a scheduling for the first group of operations distributed to the first processor and a scheduling for the second group of operations distributed to the second processor.

16. The driver assistance apparatus according to claim 15, wherein the first processor is further configured to:
distribute, based on the estimated execution times of the second plurality of operations, the first group of operations to the first processor and the second group of operations to the second processor such that the first group of operations executed by the first processor and the second group of operations executed by the second processor are balanced.

17. The driver assistance apparatus according to claim 15, wherein the first processor is further configured to:
determine a sum of execution times for the first group of operations distributed to the first processor;
determine whether the sum of the estimated execution times for the first group of operations distributed to the first processor is equal to or greater than a critical value; and
based on a determination that the sum of the estimated execution times for the first group of operations distributed to the first processor is equal to or greater than the critical value, distribute at least one operation among the first group of operations to the second processor.

18. The driver assistance apparatus according to claim 15, wherein the first processor is further configured to:
perform two-dimensional (2D) and three-dimensional (3D) based preprocessing on the second frame prior to a determination of the second scheduling;
determine the distribution of the second plurality of operations comprising the first group of operations to be executed by the first processor and the second group of operations to be executed by the second processor based on the 2D based preprocessing;
determine a sum of the estimated execution times for the first group of operations;
determine whether the sum of the estimated execution times for the first group of operations is equal to or greater than a critical value; and
based on a determination that the sum of the estimated execution times for the first group of operations is equal to or greater than the critical value and based on the 3D based preprocessing, distribute at least one operation among the first group of operations to the second processor.

19. The driver assistance apparatus according to claim 1, wherein the at least one processor is further configured to:
execute the second plurality of operations according to the second scheduling; and
measure execution times of the second plurality of operations.

20. The driver assistance apparatus according to claim 19, wherein the at least one processor is further configured to:
calculate a variation in execution time of each operation based on the measured execution times of the first plurality of operations that were executed according to the first scheduling and the measured execution times of the second plurality of operations that were executed according to the second scheduling.

21. The driver assistance apparatus according to claim 20, wherein the at least one processor is further configured to:
receive a third frame from the stereo camera; and
determine, based on the measured execution times of the second plurality of operations that were executed in the second frame, a third scheduling for a third plurality of operations to be executed in the third frame,
wherein the third scheduling is determined based on the calculated variation in execution time of each operation.

22. The driver assistance apparatus according to claim 1, further comprising a display unit configured to display a screen based on the first plurality of operations executed according to the first scheduling or the second plurality of operations executed according to the second scheduling.

23. The driver assistance apparatus according to claim 1, further comprising a memory configured to store the measured execution times of the first plurality of operations.

* * * * *